United States Patent
Ben-Haim et al.

(10) Patent No.: US 10,212,623 B2
(45) Date of Patent: Feb. 19, 2019

(54) APPARATUS, SYSTEM AND METHOD OF PACKET COALESCING

(71) Applicant: INTEL IP CORPORATION, Santa Clara, CA (US)

(72) Inventors: Shani Ben-Haim, Haifa (IL); Michael Glik, Kfar Saba (IL); Solomon B. Trainin, Hafia (IL); Izoslav Tchigevsky, Portland, OR (US); Elad Levy, Rishon LeZion (IL)

(73) Assignee: INTEL IP CORPORATION, Santa Clara, CA (US)

( * ) Notice: Subject to any disclaimer, the term of this patent is extended or adjusted under 35 U.S.C. 154(b) by 77 days.

(21) Appl. No.: 15/392,461

(22) Filed: Dec. 28, 2016

(65) Prior Publication Data

US 2018/0184326 A1 Jun. 28, 2018

(51) Int. Cl.
*H04W 28/06* (2009.01)
*H04W 52/02* (2009.01)
*H04L 29/06* (2006.01)

(52) U.S. Cl.
CPC ............ *H04W 28/06* (2013.01); *H04L 69/22* (2013.01); *H04W 52/0206* (2013.01)

(58) Field of Classification Search
CPC .. H04L 69/22; H04W 28/06; H04W 52/0206; H04W 52/02; H04W 52/0209; H04W 76/25
See application file for complete search history.

(56) References Cited

U.S. PATENT DOCUMENTS 6,920,493 B1 * 7/2005 Schwab ............... H04L 63/104
370/230
9,258,779 B2 2/2016 Glik et al.
(Continued)

FOREIGN PATENT DOCUMENTS

| KR | 20120094002 | 8/2012 |
| KR | 20130121161 | 11/2013 |
| WO | 2013020379 | 2/2013 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Benjamin H Elliott, IV
(74) *Attorney, Agent, or Firm* — Shichrur & Co.

(57) ABSTRACT

Some demonstrative embodiments include apparatuses, systems, devices and/or methods of packet coalescing. For example, an apparatus may include circuitry and logic configured to cause a first wireless station to process a notification from a second wireless station including transmit (Tx) packet coalescing information, the Tx packet coalescing information including packet type information to define one or more packet types for packet coalescing at the first wireless station, and a coalescing threshold indicator to indicate a coalescing threshold to limit the packet coalescing at the first wireless station; to coalesce a plurality of packets for the second wireless station by buffering the plurality of packets at the first wireless station, the plurality of packets having at least one of the one or more packet types; and, based at least on the coalescing threshold, to process one or (Continued)

more buffered packets of the plurality of packets for transmission to the second wireless station.

24 Claims, 10 Drawing Sheets

(56) References Cited

U.S. PATENT DOCUMENTS

| | | | | |
|---|---|---|---|---|
| 2005/0052994 | A1* | 3/2005 | Lee | H04L 47/10 370/230 |
| 2005/0083917 | A1* | 4/2005 | Okamoto | H04L 29/06 370/352 |
| 2008/0057913 | A1 | 3/2008 | Sinha et al. | |
| 2008/0084851 | A1* | 4/2008 | Kim | H04W 72/048 370/336 |
| 2010/0091723 | A1* | 4/2010 | Park | H01J 1/304 370/329 |
| 2010/0115528 | A1 | 5/2010 | Piipponen et al. | |
| 2010/0312928 | A1* | 12/2010 | Brownell | G06F 13/387 710/57 |
| 2013/0077610 | A1 | 3/2013 | Amini et al. | |
| 2014/0071873 | A1* | 3/2014 | Wang | H04W 74/08 370/311 |
| 2014/0164641 | A1* | 6/2014 | Ye | H04L 47/127 709/235 |
| 2014/0201222 | A1* | 7/2014 | C. N. | G06F 17/30454 707/754 |
| 2015/0282072 | A1* | 10/2015 | Glik | H04W 52/02 455/574 |
| 2016/0373380 | A1* | 12/2016 | Nagayama | H04L 12/6418 |
| 2017/0048142 | A1* | 2/2017 | Makineni | H04L 69/16 |

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wi-Fi Alliance Technical Committee P2P Task Group; Wi-Fi Peer-to-Peer (P2P) Technical Specification; Version 1.2; Dec. 14, 2011; 160 pages.
Wireless Gigabit Alliance (WGA) Specifications; WiGig MAC and PHY Specification Version 1.1, Apr. 2011—Final Specification; 442 pages.
Office Action for U.S. Appl. No. 14/225,109, dated Jun. 11, 2015, 14 pages.
International Search Report and Written Opinion for International Patent Application No. PCT/US2015/017449, dated May 28, 2015, 7 pages.
International Preliminary Report on Patentability for PCT/US2015/017449, dated Oct. 6, 2016, 6 pages.
Notice of Allowance for U.S. Appl. No. 14/225,109, dated Sep. 25, 2015, 12 pages.

* cited by examiner

APPARATUS, SYSTEM AND METHOD OF PACKET COALESCING

TECHNICAL FIELD

Embodiments described herein generally relate to packet coalescing.

BACKGROUND

Devices of a wireless communication network may communicate one or more packets, e.g., unicast, broadcast and/or multicast packets. Some of these packets may be received by a plurality of clients of the wireless communication network. However, some of the packets may not be immediately relevant for some of the clients, and/or may contain information, which may be received with some delay.

A packet, which is received by a client, may require handling and/or packet processing of the packet, e.g., by one or more hardware and/or software layers of the client.

The handling of the packet may consume a significant amount of power, and/or may involve waking up the client from a power save state.

Packets that are received intermittently may cause a client and/or one or more components of the client, e.g., a host, a processor, a network interface and/or the like, an intermittent pattern of operation including many switches between a power save state and an active state.

This intermittent pattern of operation may eventually prevent an optimal power consumption of the client, for example, as the intermittent packet handling may not allow a continuous power save state for one or more functions and/or components, which are involved in the packer processing, e.g., a receive data path of the client.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
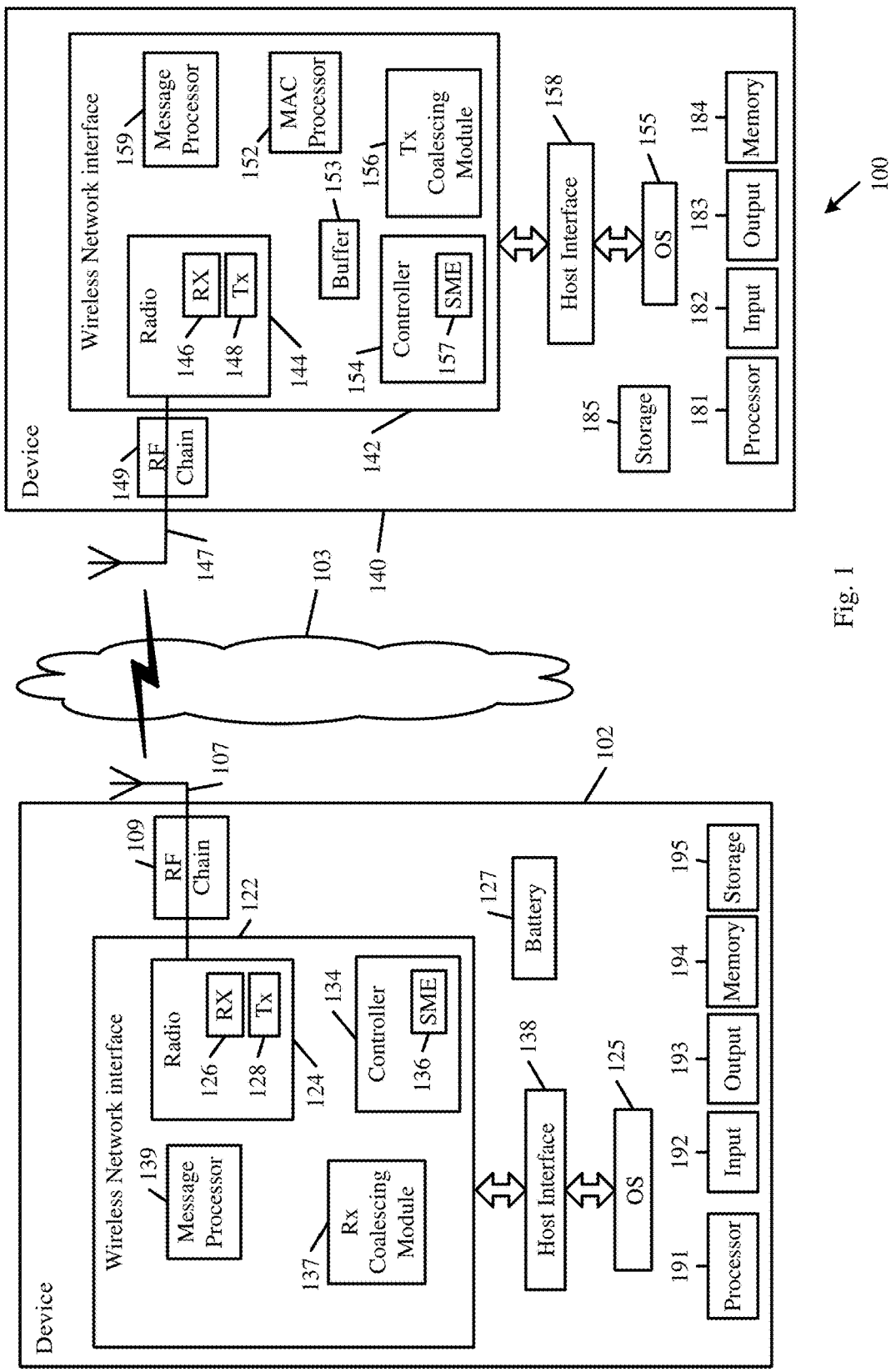
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac*-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); *IEEE 802.11ad* ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D6.0, June 2016, draft standard for Information technology—Telecommunications and information exchange between systems Local and metropolitan area networks Specific requirements; Part 11: Wireless LAN Medium Access Control (MAC) and Physical Layer (PHY) Specification*"); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing WiFi Alliance (WFA) Peer-to-Peer (P2P) specifications (including *WiFi P2P technical specification, version 1.5*, Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1*, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

The phrases "powering down" and "power down" as used herein with relation to a device and/or a component may refer, for example, to reducing, diminishing, shutting down, powering off, turning off and/or switching off the electrical current to the device and/or component, and/or to switching the device and/or component to operate at a sleep mode, a reduced-power mode, a power save mode, a stand-by mode and/or any other operation mode which consumes less power than required for full and/or normal operation of the device and/or component.

The phrases "powering up", "power up", "wake up" and "waking up" as used herein with relation to a device and/or a component may refer, for example, to enhancing, resuming, turning on and/or switching on the electrical current to the device and/or component and/or to changing the device and/or component from sleep mode, power save mode, stand by mode or any other operation mode, which consumes less power than required for full and/or normal operation of the device and/or component, to an operational mode or an active mode.

The phrases "power save", "power-save state" and "idle power state", as used herein, with relation to a device and/or a component may refer, for example, to operation of the device and/or the component at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of data.

The phrases "active" and "active state", as used herein, with relation to a device and/or a component, may refer, for example, to an operational mode, which enables full and/or normal operation of the device and/or component, e.g., full reception, handling, decoding, transmitting and/or processing of data.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an AN device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) 125 of device 102 and/or of one or more suitable applications. Processor 181 may execute instructions, for example, of an Operating System (OS) 155 of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, wireless network 103 may include, for example, a radio channel, a cellular channel, an RF channel, a WiFi channel, an IR channel, and the like. One or more elements of system 100 may optionally be capable of communicating over any suitable wired communication links.

In some demonstrative embodiments, wireless communication devices 102 and/or 140 may include one or more wireless network interfaces to interface with wireless network 103. For example, wireless communication device 102 may include a wireless network interface 122 to interface between wireless communication device 102 and wireless network 103, and/or wireless communication device 140 may include a wireless network interface 142 to interface between wireless communication device 140 and wireless network 103.

In some demonstrative embodiments, wireless network interfaces 122 and/or 142 may include one or more radios to perform wireless communication between wireless communication device 102, wireless communication device 140, and/or one or more other wireless communication devices. For example, wireless network interface 122 may include at least one radio 124, and/or wireless network interface 142 may include at least one radio 144.

In some demonstrative embodiments, radio 124 and/or radio 144 may include one or more wireless receivers (Rx) including circuitry and/or logic to receive wireless communication signals, RF signals, frames, blocks, transmission streams, packets, messages, data items, and/or data. For example, radio 124 may include at least one receiver 126, and/or radio 144 may include at least one receiver 146.

In some demonstrative embodiments, radio 124 and/or radio 144 may include one or more wireless transmitters (Tx) including circuitry and/or logic to transmit wireless communication signals, RF signals, frames, blocks, transmission streams, packets, messages, data items, and/or data. For example, radio 124 may include at least one transmitter 128, and/or radio 144 may include at least one transmitter 148.

In some demonstrative embodiments, radio 124 and/or radio 144, transmitters 128 and/or 148, and/or receivers 126 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 124 and/or radio 144 may include or may be implemented as part of a wireless Network Interface Card (NIC), and the like.

In some demonstrative embodiments, radios 124 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 124 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more RF chains 109 connected to, and/or associated with, antennas 107.

In some demonstrative embodiments, one or more of RF chains 109 may be included as part of, and/or implemented as part of one or more elements of radio 124, e.g., as part of transmitter 128 and/or receiver 126.

In some demonstrative embodiments, device 140 may include one or more RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, wireless network interface 122 may include a controller 134, and/or wireless network interface 142 may include a controller 154. Controller 134 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 134 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 134 and/or 154, respectively. Additionally or alternatively, one or more functionalities of controllers 134 and/or 154 may be implemented by logic, which may be executed by a machine and/or one or more processors, e.g., as described below.

In one example, controller 134 may include circuitry and/or logic, for example, a memory and one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, a memory and one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, wireless network interface 122 may include a message processor 139 configured to generate, process and/or access one or messages communicated by device 102.

In one example, message processor 139 may be configured to generate one or more messages to be transmitted by device 102, and/or message processor 139 may be configured to access and/or to process one or more messages received by device 102, e.g., as described below.

In some demonstrative embodiments, wireless network interface 122 may include a message processor 159 configured to generate, process and/or access one or messages communicated by device 140.

In one example, message processor 159 may be configured to generate one or more messages to be transmitted by device 140, and/or message processor 159 may be configured to access and/or to process one or more messages received by device 140, e.g., as described below.

In some demonstrative embodiments, message processors 129 and/or 159 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 129 and/or 159, respectively. Additionally or alternatively, one or more functionalities of message processors 129 and/or 159 may be implemented by logic, which may be executed by a machine and/or one or more processors, e.g., as described below.

In some demonstrative embodiments, at least part of the functionality of message processor 139 may be implemented as part of radio 124, and/or at least part of the functionality of message processor 159 may be implemented as part of radio 144.

In some demonstrative embodiments, at least part of the functionality of message processor 139 may be implemented as part of controller 134, and/or at least part of the functionality of message processor 159 may be implemented as part of controller 154.

In other embodiments, the functionality of message processor 139 may be implemented as part of any other element of device 102, and/or the functionality of message processor 159 may be implemented as part of any other element of device 140.

In some demonstrative embodiments, at least part of the functionality of controller 134 and/or message processor 139 may be implemented by an integrated circuit, for example, a chip, e.g., a System on Chip (SoC). In one example, the chip or SoC may be configured to perform one or more functionalities of radio 124. For example, the chip or SoC may include one or more elements of controller 134, one or more elements of message processor 139, and/or one or more elements of radio 124. In one example, controller 134, message processor 139, and radio 124 may be implemented as part of the chip or SoC.

In other embodiments, controller 134, message processor 139 and/or radio 124 may be implemented by one or more additional or alternative elements of device 102.

In some demonstrative embodiments, at least part of the functionality of controller 154 and/or message processor 159 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 159, and/or one or more elements of radio 144. In one example, controller 154, message processor 159, and radio 144 may be implemented as part of the chip or SoC.

In other embodiments, controller 154, message processor 159 and/or radio 144 may be implemented by one or more additional or alternative elements of device 140.

In some demonstrative embodiments, wireless communication device 102 may include a host interface 138 configured to interface between a host, e.g., OS 125, and wireless network interface 122.

In some demonstrative embodiments, host interface 138 may enable OS 125 to configure one or more elements of wireless network interface 122; and/or to transfer and/or to receive data, from the one or more elements of wireless network interface 122.

In some demonstrative embodiments, wireless communication device 140 may include a host interface 158 configured to interface between a host, e.g., OS 155 and wireless network interface 142.

In some demonstrative embodiments, host interface 158 may enable OS 155 to configure one or more elements of wireless network interface 142; and/or to transfer and/or to receive data, from the one or more elements of wireless network interface 142.

In some demonstrative embodiments, wireless communication devices 102 and 140 may communicate one or more packets, e.g., including unicast, broadcast and/or multicast packets ("communication packets"), between devices 102, 140, and/or one or more other wireless communication devices.

In some demonstrative embodiments, one or more of the communication packets may be received by a plurality of clients. However, some of the communication packets may not be immediately relevant for some of the clients, and/or may contain information, which may be received and/or processed with some delay by some of the clients.

For example, device 102 may receive one or more communication packets, which may not be immediately relevant for device 102, and/or may contain information, which may be received and/or processed by device 102 with some delay.

In some demonstrative embodiments, device 102 may be configured to process a received communication packet, for example, using one or more hardware and/or software layers of device 102. For example, device 102 may use OS 125, one or more components of wireless network interface 122, and/or one or more other components of device 102, for example, to process the received communication packet.

In some demonstrative embodiments, one or more elements of device 102, e.g., OS 125, may switch device 102 between an active power state and a power save state, for example, to reduce power consumption of device 102, and/or to prolong a battery life of a battery 127 of device 102.

In one example, device 102 may be switched to the power save state during one or more idle periods of device 102, for example, if device 102 is not being used, e.g., by a user of device 102 and/or by OS 125, for a relatively long period of time.

In another example, OS 125 may switch device 102 to the power save state during idle periods of device 102, for example, if device 102 is not required to handle and/or process one or more received communication packets.

In some demonstrative embodiments, device 102 may power down one or more elements of device 102, which may have increased power consumption, for example, to reduce a power consumption of device 102.

In some demonstrative embodiments, device 102 may consume a significant amount of power, and/or may to perform often switches from a power save state to a an active state, for example, if device 102 is required to immediately handle and/or process every received communication packet.

In some demonstrative embodiments, communication packets, which may be received intermittently, may cause device 102 and/or one or more components of device 102, e.g., OS 125, wireless network interface 122, processor 191, and or one or more other components of device 102, to operate according to an intermittent patent in including intermittent switching between a power save state and a wakeup state.

In some demonstrative embodiments, operating device 102 according to this intermittent power save/wakeup pattern may lead to inefficient power consumption of device 102, for example, as processing of every received communication packet may prevent a continuous power save state for one or more functions and/or components involved in the processing of the packet, e.g., a receive data path of device 102.

Figure 2:
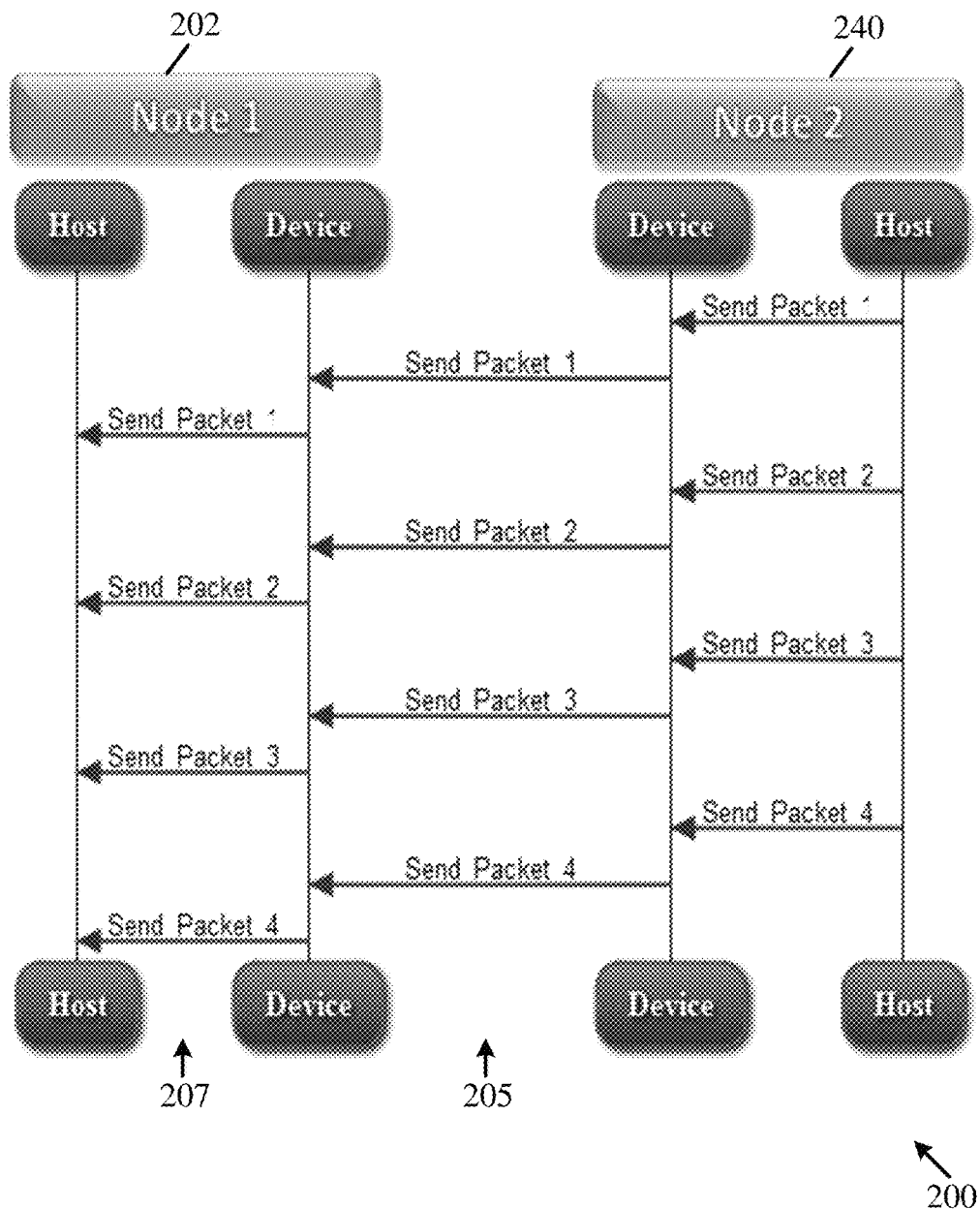
FIG. 2 is a schematic sequence diagram of operations and interactions between a first wireless communication device and a second wireless communication device.

Reference is made to FIG. 2, which schematically illustrates a sequence diagram 200 of communication between a first wireless device 202 and a second wireless device 240.

As shown in FIG. 2, device 240 may transmit a plurality of packets 205 to device 202.

As shown in FIG. 2, every packet 205 may be received by device 202 and may be sent (207) to a host, e.g., an OS, of device 202, for example for handling and/or processing.

As shown in FIG. 2, device 202 may receive and process packets 205, even if packets 205 include packets, which may not be immediately relevant for device 202 and/or may contain information, which may be received and/or processed with some delay.

As shown in FIG. 2, device 202 may not be able to stay in a power save state for a long time, as device 202 may be required be awake for each and every packet 205. Accordingly, during the operations of sequence diagram 200, device 202 may not be able to save power.

Referring back to FIG. 1, in some demonstrative embodiments, OS 125 may utilize a packet coalescing mechanism, which may allow OS 125 to define one or more packet types, which may be provided to and/or processed by OS 125, for example, with a reasonable delay, e.g., as described below.

In some demonstrative embodiments, OS 125 may define Receive (Rx) packet coalescing information defining one or more packet types of Rx packets to be coalesced for processing by OS 125, and a coalescing threshold to limit coalescing of the Rx packets.

In some demonstrative embodiments, the coalescing threshold may include a coalescing time threshold and/or a coalescing size threshold, e.g., as described below.

In some demonstrative embodiments, the coalescing time threshold may be configured to limit a time period to buffer the plurality of the Rx packets, e.g., prior to providing the Rx packets for further processing.

In some demonstrative embodiments, the coalescing size threshold may be configured to limit a total size of the Rx packets, e.g., prior to providing the Rx packets for further processing.

In some demonstrative embodiments, OS 125 may send the Rx packet coalescing information to wireless network interface 122, for example, via host interface 138.

In some demonstrative embodiments, wireless network interface 122 may receive the Rx packet coalescing information from OS 125.

In some demonstrative embodiments, controller 134 may process the Rx packet coalescing information defining the one or more packet types of Rx packets to be coalesced for processing by the OS 125, and the coalescing threshold to limit coalescing of the Rx packets.

In some demonstrative embodiments, the one or more packet types of Rx packets to be coalesced for processing by the OS 125 may include, for example, one or more Internet Protocol (IP) packets, for example, one or more IP version 4 (IPv4) packet types, e.g., as described below.

In one example, the one or more packet types to be coalesced may include packets for announcement of an IP change. For example, the one or more packet types to be coalesced may include address resolution protocol (ARP) packets, e.g., having attributes of a Mac packet type of broadcast and/or a Mac ethertype of 0x0806.

In one example, the one or more packet types to be coalesced may include NetBIOS over TCP/IP (NetBT) packets, e.g., having attributes of a Mac packet type of broadcast, a Mac ethertype of 0x0800, an IPv4 protocol of 17, and/or a Dest port of 137.

In one example, the one or more packet types to be coalesced may include Link-Local Multicast Name Resolution (LLMNR) packets, e.g., having attributes of a Mac packet type of multicast, a Mac ethertype of 0x0800, an IPv4 protocol of 17, and/or a Dest port of 5355.

In some demonstrative embodiments, the one or more packet types of Rx packets to be coalesced for processing by the OS 125 may include, for example, one or more IP version 6 (IPv6) packet types, e.g., as described below.

In one example, the one or more packet types to be coalesced may include Neighbor Solicitation (NS) packets.

In one example, the one or more packet types to be coalesced may include Web Services Dynamic Discovery (WSDiscovery) packets, e.g., having attributes of a Mac packet type of multicast, a Mac ethertype of 0x086dd, an IPv4 protocol of 17, and/or a Dest port of 3702.

In one example, the one or more packet types to be coalesced may include Simple Service Discovery Protocol (SSDP) packets, e.g., having attributes of a Mac packet type of multicast, a Mac ethertype of 0x086dd, an IPv4 protocol of 17, and/or a Dest port of 1900.

In some demonstrative embodiments, the one or more packet types of Rx packets to be coalesced for processing by the OS 125 may include, for example, one or more other additional or alternative packet types.

In some demonstrative embodiments, it may not be efficient, e.g., in terms of power consumption to perform the packet coalescing of the one or more packet types at device 102, e.g., as described below.

In some demonstrative embodiments, a packet coalescing mechanism (also referred to as "Rx coalescing filter") implemented at a receiver device, e.g., device 102, may have one or more disadvantages, for example, in terms of power preservation, e.g., as described below.

In some demonstrative embodiments, device 102 may include an RX coalescing module 137 configured to perform operations of the Rx coalescing filter, e.g., as described below. In other embodiments, device 102 may not include Rx coalescing module 137 and/or may not implement one or more functionalities of Rx coalescing filter 137, e.g., as described below.

In some demonstrative embodiments, Rx coalescing module 137 may determine, for example, upon reception and parsing of a packet, whether or not the packet matches the one or more packet types, may buffer the packet, and may not interrupt OS 125, for example, if the packet matches the one or more packet types.

In some demonstrative embodiments, Rx coalescing module 137 may interrupt OS 125, for the availability of buffered packets, for example, upon reaching the coalescing threshold, e.g., a specific time or a packet amount threshold.

In some demonstrative embodiments, upon receiving a packet that does not match the one or more packet types, Rx coalescing module 137 may interrupt OS 125, e.g., immediately, and send the packet to OS 125, for example, along with one or more, e.g., all, previously buffered packets.

In some demonstrative embodiments, implementing an Rx coalescing filter may allow reducing a power consumption of a device, for example, by reducing or minimizing a number of interrupts to an OS of the device. However, the Rx coalescing filter may require one or more operations at the device, which may consume power and/or may prevent prolonged stay at a power save mode of the device. For example, the Rx coalescing filter may require one or more operations of radio 124, and/or wireless network interface 122 to process the packet; and/or one or more operations of Rx coalescing module 137 to determine whether or not the packet matches the one or more packet types.

Figure 3:
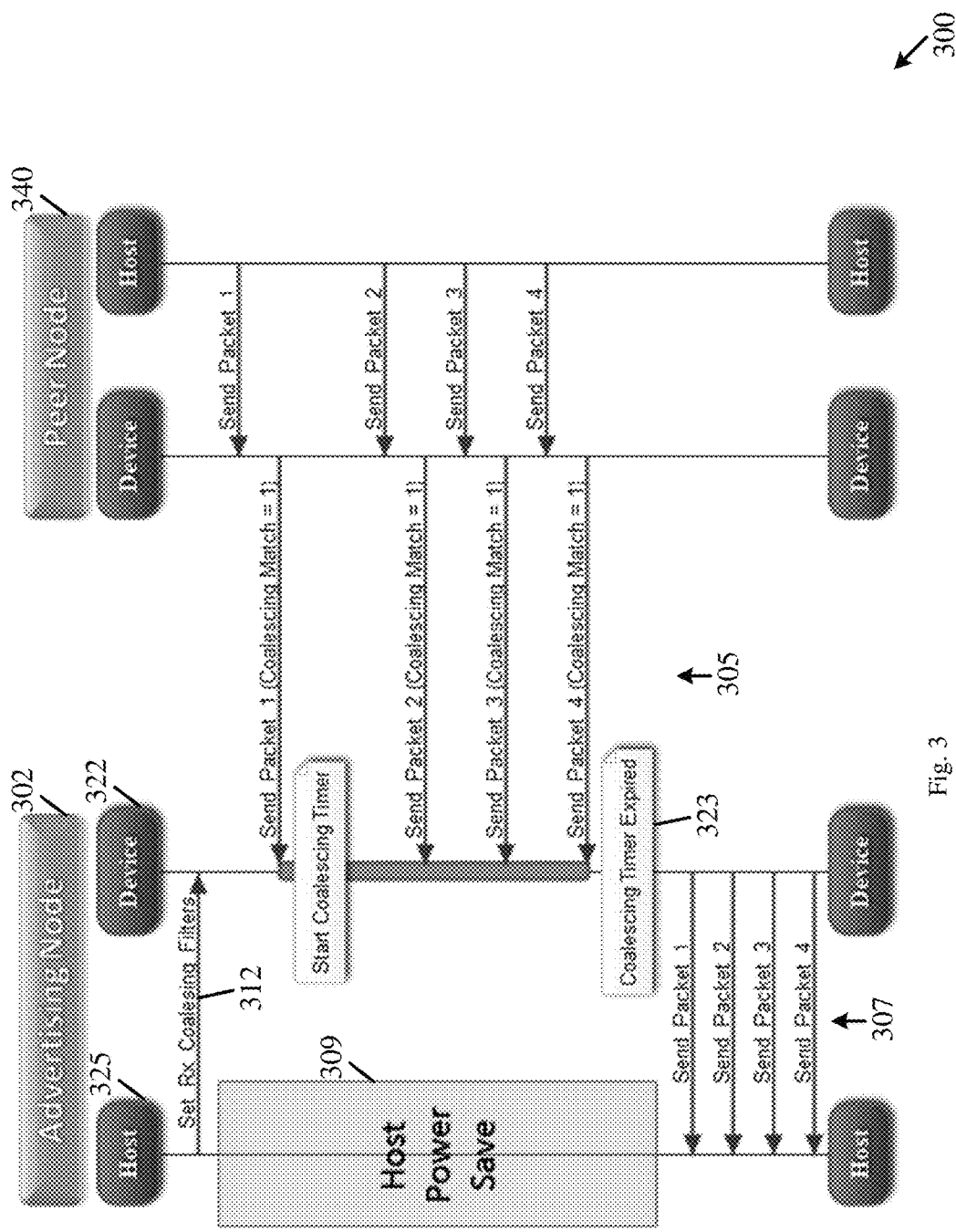
FIG. 3 is a schematic sequence diagram of operations and interactions between a first wireless communication device and a second wireless communication device.

Reference is made to FIG. 3, which schematically illustrates a sequence diagram 300 of communication between a first wireless device 302 and a second wireless device 340.

In some demonstrative embodiments, device 302 may utilize an Rx coalescing filter mechanism.

In some demonstrative embodiments, a host 325 of device 302, e.g., the OS of device 302, may define the one or more packet types of Rx packets to be coalesced for processing by the OS 325, and the coalescing threshold to limit coalescing of the Rx packets.

As shown in FIG. 3, device 302 may send Rx packet coalescing information 312 to a wireless communication interface 322 of the device 302.

The Rx packet coalescing information 312 may include the one or more packet types of Rx packets to be coalesced for processing by host 325, and the coalescing threshold to limit coalescing of the Rx packets.

As shown in FIG. 3, device 340 may transmit a plurality of packets 305 to device 302.

As shown in FIG. 3, every packet 305 may be received by device 302 and may be processed to determine, e.g., by an Rx coalescing module of interface 322, for example, whether or not a packet type of every packet 305 matches the one or more packet types to be coalesced for processing by host 325.

As shown in FIG. 3, packet 305 may be buffered at device 302, for example, if packet type of packets 305 matches the one or more packet types.

As shown in FIG. 3, wireless communication interface 322 may send (307) packets 305 to host 325, for example, upon expiration (323) of a timer, which may be set based on the coalescing threshold, or upon receiving a packet that does not match the one or more packet types.

As shown in FIG. 3, every packet 305 may be received by device 302 and may be processed to determine, e.g., by the Rx coalescing module of interface 322, whether the packet is to be provided to a host, e.g., an OS, of device 202.

As shown in FIG. 3, during a period 309, host 325 may be in a power save state, e.g., if wireless communication interface 322 buffers packets 305. However, device 302 and/or wireless communication interface 322 may be required to receive and process each incoming packet 305, and therefore may not be able to remain in a power save state.

As shown in FIG. 3, implementation of the Rx coalescing filter may allow reducing the number of interrupts from wireless communication interface 322 to the OS 325. However, the Rx coalescing filter is not optimized with respect to a power consumption of device 302, e.g., as device 302 and/or wireless communication interface 322 may be required to intermittently process and/or handle incoming packets 305.

Referring back to FIG. 1, an optimization of a power consumption of a device, e.g., a longer battery life, may be required as devices have a small and/or a light design resulting with a small battery size.

In some demonstrative embodiments, in some cases, implementations, and/or scenarios, implementing the Rx coalescing filter, e.g., as described above with reference to FIG. 3, may not provide a sufficient technical solution for power consumption, for example, as power may be consumed upon a reception and/or processing of Rx packets, which may eventually be delayed for processing.

In some demonstrative embodiments, devices 102 and/or 140 may implement an enhanced network protocol mechanism (also referred to as "Tx coalescing filter"), which may allow reducing or even minimizing unnecessary wake ups of a device from a power save state, e.g., as a result of a reception of Rx packets that may be potentially delayed.

In some demonstrative embodiments, a packet coalescing mechanism may be configured to reduce or even minimize the unnecessary wake ups of a device, e.g., device 102, for example, by grouping the Rx packets at a sender of the Rx packets, e.g., device 140, into a single buffer prior to transmission, and receiving the RX packets at a same time, e.g., at device 102. Accordingly, the Tx coalescing filter mechanism may enable, for example, a technical advantage of prolonging a power save state and/or allowing a converged active state, e.g., to process all the incoming Rx packets at once.

In some demonstrative embodiments, the Tx coalescing filter mechanism may allow, for example, offloading one or more operations of the packet coalescing, e.g., even the entire procedure of the packet coalescing, from a first device ("also referred to as advertizing device"), e.g., device 102, to a second device ("peer node" or "peer device"), e.g., device 140, e.g., as described below.

In some demonstrative embodiments, device 102 may initiate the offloading of the packet coalescing from device 102 to device 140, for example, as part of a power state change of device 102, e.g., as described below.

In some demonstrative embodiments, device 102 may initiate a signaling of packet coalescing information from device 102 to device 140, for example, upon a change in the Rx packet information defining the one or more packet types of Rx packets to be coalesced for processing by host 125.

In some demonstrative embodiments, device 102 may initiate the offloading of the packet coalescing from device 102 to device 140 and/or the signaling of the packet coalescing information, for example, upon any other event, operation, criterion, trigger, and/or a state of device 102.

In some demonstrative embodiments, devices 102 and/or 140 may be configured to signal the packet coalescing information and or to signal an initiation and/or a termination of packet coalescing, e.g., from device 102 to device 140, for example, according to a mechanism of platform power state advertising and control, e.g., as described below. For example, this mechanism may provide a solution for allowing an advertizing device to trigger one or more operations on one or more packet types at a transmitter side, e.g., a device to transmit the packets, and/or to allow signaling of one or more parameters from the advertizing device to the transmitter side.

In some demonstrative embodiments, an enhanced mechanism may be provided to support offloading packet coalescing filter logic from the advertiser side to the transmitter side, e.g., as described below.

In some demonstrative embodiments, the advertising node, e.g., device 102, and/or the peer node, e.g., device 140, may be configured to initiate a negotiation and/or signaling of the packet coalescing as part of power state change, e.g., of the advertising node, e.g., device 102. In other embodiments, the advertising node, e.g., device 102, and/or the peer node, e.g., device 140, may be configured to initiate a negotiation and/or signaling of the packet coalescing as part of any other state change, and/or any additional or alternative criterion.

In some demonstrative embodiments, device 102 may be configured to transmit to device 140 a notification including transmit (Tx) packet coalescing information for packet coalescing at device 140, e.g., as described below.

In some demonstrative embodiments, the Tx packet coalescing information may include packet type information to indicate that packets of one or more packet types are to be coalesced for device 102 at device 140, e.g., as described below.

In some demonstrative embodiments, the Tx packet coalescing information may include a coalescing threshold indicator to indicate a coalescing threshold is to limit the packet coalescing at device 140, e.g., as described below.

In some demonstrative embodiments, controller 134 may be configured to control, cause, and/or trigger a first wireless station implemented by device 102 and/or wireless network interface 122 to process Rx packet coalescing information from a host of device 102, In some demonstrative embodiments, the Rx packet coalescing information may define one or more packet types of Rx packets to be coalesced for processing by the host of device 102, and a coalescing threshold to limit coalescing of the Rx packets.

In some demonstrative embodiments, controller 134 may be configured to control, cause, and/or trigger the first wireless station implemented by device 102 and/or wireless network interface 122 transmit to a second wireless station, e.g., a wireless station implemented by device 140, a notification including Tx packet coalescing information for packet coalescing at the second wireless station, e.g., as described below.

In some demonstrative embodiments, the Tx packet coalescing information may include packet type information to indicate that packets of the one or more packet types, e.g., as defined by the host of device 102, are to be coalesced for the first wireless station at the second wireless station, e.g., as described below.

In some demonstrative embodiments, the Tx packet coalescing information may include the coalescing threshold indicator to indicate the coalescing threshold, e.g., as received from the host of device 102, is to limit the packet coalescing at the second wireless station, e.g., as described below.

In some demonstrative embodiments, the coalescing threshold may include a coalescing time threshold or a coalescing size threshold, e.g., as described below.

In some demonstrative embodiments, the notification may include a power save indication to indicate a power save state of device 102, e.g., as described below.

In some demonstrative embodiments, the notification may include a Platform Power State Advertising (PPSA) Information Element (IE), e.g., as described below.

In some demonstrative embodiments, the PPSA IE may include a first field including a power indication to indicate the power save state of the first wireless station, e.g., as described below.

In some demonstrative embodiments, the PPSA IE may include at least one second field including the Tx packet coalescing information, e.g., as described below.

In some demonstrative embodiments, controller 134 may be configured to control, cause, and/or trigger the wireless station implemented by device 102 and/or wireless network interface 122 to transmit the notification including the PPSA IE to device 140.

In some demonstrative embodiments, controller 134 may include a station management entity (SME) 136 configured to generate and/or send the notification including the PPSA IE to device 140.

In one example, message processor 139 may be configured to generate the PPSE IE, and/or SME 136 may control transmitter 128 to transmit the notification including the PPSE IE to device 140.

In some demonstrative embodiments, device 140 may receive from device 102 the notification, which may include, for example, the packet type information to define the one or more packet types for packet coalescing at device 140, and the coalescing threshold indicator to indicate the coalescing threshold to limit the packet coalescing at device 140.

In some demonstrative embodiments, controller 154 may be configured to control, cause, and/or trigger wireless network interface 142 to coalesce a plurality of packets for device 102, for example, by buffering the plurality of packets at device 140.

In some demonstrative embodiments, the plurality of packets may have at least one of the one or more packet types, e.g., as indicated by the notification from device 102 for packet coalescing at device 140.

In some demonstrative embodiments, controller 154 may be configured to control, cause, and/or trigger wireless network interface 142 to process one or more buffered packets of the plurality of packets for transmission to the wireless station implemented by device 102, for example, based at least on the coalescing threshold, e.g., as indicated by the notification from device 102 to limit the packet coalescing at device 140.

In some demonstrative embodiments, wireless network interface 142 may include a buffer 153 configured to buffer the plurality of packets, e.g., for device 102.

In some demonstrative embodiments, wireless network interface 142 may include a Tx coalescing module 156 configured to selectively buffer a packet in the buffer, for example, based on a comparison between a packet type of the packet and the one or more packet types.

In some demonstrative embodiments, wireless network interface 142 may include an SME 157 configured to process the notification from device 102, e.g., from SME 136.

In some demonstrative embodiments, SME 157 may configure the Tx coalescing module 156, for example, based on the Tx packet coalescing information. For example, SME 157 may setup the Tx coalescing module 157, for example, based on the one or more packet types.

In some demonstrative embodiments, wireless network interface 142 may include a MAC processor 152 configured to perform MAC processing of the one or more buffered packets for the wireless station implemented by device 102.

In some demonstrative embodiments, Tx coalescing module 156 may be configured to provide the one or more buffered packets to the MAC processor 152, for example, based at least on the coalescing threshold, e.g., as described below.

In some demonstrative embodiments, controller 154 may be configured to control, cause, and/or trigger wireless network interface 142 to process the one or more buffered packets for transmission to device 102, for example, upon reaching the coalescing threshold.

In one example, controller 154 may be configured to control, cause, and/or trigger wireless network interface 142 to process the one or more buffered packets, for example, when the time period to buffer the plurality of packets expires.

In another example, wireless network interface 142 may process the one or more buffered packets, for example, when the total size of the plurality of buffered packets reaches the coalescing threshold.

In some demonstrative embodiments, controller 154 may be configured to control, cause, and/or trigger wireless network interface 142 to process the one or more buffered packets for transmission to device 102, for example, at a latest of a packet having a packet type, which is not included in the one or more packet types, is available for device 102; and reaching the coalescing threshold, e.g., as described below.

In some demonstrative embodiments, controller 154 may be configured to control, cause, and/or trigger wireless network interface 142 to process the one or more buffered packets, for example, when a packet having a packet type, which is not included in the one or more packet types, is available for the wireless station implemented by device 102, for example, even if the coalescing threshold is not reached.

In some demonstrative embodiments, controller 154 may be configured to control, cause, and/or trigger wireless network interface 142 to process the one or more buffered packets for transmission to the wireless station implemented by device 102, for example, upon processing a packet for device 102, which has a packet type, which is not included in the one or more packet types.

In some demonstrative embodiments, Tx filter module 156 may be configured to buffer a plurality of packets during a time period, which may be limited by the coalescing time threshold. According to this example, upon processing a packet for device 102, which is not included in the one or more packet types, wireless network interface 142 may process both the packet and one or more of the plurality of buffered packets, for example, even if the time period has not expired.

In some demonstrative embodiments, controller 154 may be configured to control, cause, and/or trigger wireless network interface 142 to process the one or more buffered packets for transmission to device 102, for example, only upon reaching the coalescing threshold, for example, when no packet having a packet type, which is not included in the one or more packet types, is available for device 102, e.g., prior to reaching the coalescing threshold.

In some demonstrative embodiments, controller 154 may be configured to control, cause, and/or trigger wireless network interface 142 to transmit the one or more buffered packets to device 102, for example, based on processing the packets for transmission, e.g., by MAC processor 152.

In some demonstrative embodiments, controller 154 may be configured to control, cause, and/or trigger wireless network interface 142 to transmit the one or more buffered packets to device 102, for example, within a same Transmit Opportunity (TxOP).

In some demonstrative embodiments, controller 154 may be configured to control, cause, and/or trigger wireless network interface 142 to process for transmission all of the plurality of packets buffered for device 102.

In some demonstrative embodiments, controller 154 may be configured to control, cause, and/or trigger wireless network interface 142 to process for transmission only some of the plurality of packets buffered for device 102.

In one example, the plurality of packets buffered for device 102 may include a plurality of similar packets, e.g., having a similar packet type and/or including a similar type of information. According to this example, controller 154 may be configured to control, cause, and/or trigger wireless network interface 142 to process for transmission only some of the plurality of similar packets buffered for device 102.

In some demonstrative embodiments, controller 154 may be configured to control, cause, and/or trigger wireless network interface 142 to transmit an aggregate transmission including the one or more buffered packets for device 102.

For example, the aggregate transmission may include an aggregate frame, for example, an Aggregate MAC Protocol Data Unit (A-MPDU) frame including the plurality of packets.

In some demonstrative embodiments, device 102 may receive one or more transmissions including the one or more buffered packets from device 140.

In some demonstrative embodiments, controller 134 may be configured to control, cause, and/or trigger wireless network interface 122 to process one or more transmissions from device 140 including one or more packets of the one or more packet types, which are coalesced by device 140 for device 102.

For example, wireless network interface 122 may process the one or more buffered packets transmitted from device 140.

In some demonstrative embodiments, device 102 may receive the one or more transmissions from device 140, for example, based on the coalescing threshold, e.g., as described below.

In some demonstrative embodiments, the one or more transmissions from device 140 to device 102 may be before the coalescing threshold is reached, for example, only when the one or more transmissions include at least one packet of a packet type, which is not included in the one or more packet types indicated by device 102 for coalescing, e.g., as described above.

In some demonstrative embodiments, the one or more transmissions from device 140 to device 102 may be only when the coalescing threshold is reached, for example, when the coalescing threshold is reached, and the one or more transmissions include only packets of the one or more packet types, e.g., a packet of a packet type, which is not included in the one or more packet types, was not available, e.g., as described above.

In some demonstrative embodiments, the one or more transmissions from device 140 to device 102 may be only when the coalescing threshold is reached, and the one or more transmissions include only packets of the one or more packet types, e.g., as described above.

In some demonstrative embodiments, devices 102 and/or 140 may imitate and/or terminate the coalescing for device 102 at device 140, for example, based on a power save indication from device 102. For example, device 102 may send the power save indication in the first field of the PPSE IE, e.g., as described below.

In some demonstrative embodiments, device 102 may transmit to device 140 the notification, which may include the power save indication to indicate the power save state of device 102, for example, to initiate the coalescing for device 102 at device 140.

In some demonstrative embodiments, controller 134 may be configured to control, cause, and/or trigger wireless network interface 122 to indicate to device 140 that the packet coalescing at device 140 is to be terminated, for example, by transmitting to device 140 a subsequent notification including a power active indication to indicate a power active state of device 102. For example, For example, device 102 may send the power active indication in the first field of the PPSE IE in the subsequent notification.

In some demonstrative embodiments, controller 134 may be configured to control, cause, and/or trigger wireless network interface 122 to transmit the subsequent notification to the device 140, for example, to terminate the packet coalescing at device 140, e.g., for device 102.

In some demonstrative embodiments, device 140 may receive the subsequent notification including the power active indication to indicate the power active state of device 102, e.g., in the first field of the PPSE IE in the subsequent notification.

In some demonstrative embodiments, controller 154 may be configured to control, cause, and/or trigger wireless network interface 142 to terminate the packet coalescing for device 102, for example, upon receipt from device 102 of the subsequent notification including the power active indication to indicate the power active state of device 102.

In some demonstrative embodiments, offloading the packet coalescing of packets to be received by a receiving device, e.g., device 102, from the first device, to the transmitting device, e.g., to device 140, may reduce or even minimize a packet traffic over the air, and/or may allow one or both of transmitting and receiving devices prolonged low power state, which may reduce power consumption of devices 102 and/or 140, and/or may increase battery life.

In some demonstrative embodiments, offloading the packet coalescing from device 102, e.g., to device 140, may increase spectrum, e.g., a channel frequency, usage, and/or may decrease packet collisions, for example, by coalescing packets to a single Transmit Opportunity (TxOP), which may allow other wireless devices to transmit in time slots that may become available.

In some demonstrative embodiments, offloading the packet coalescing from the receiving device to the transmitting device may reduce a processing complexity of the receiving device. For example, a receiving device may implement several hardware-based processing mechanisms, for example, to allow a pre-processing of received packets, e.g., prior to sending the packets to a host of the device, for example, if the packet coalescing is to be implemented at the receiving device. Accordingly, these processing mechanisms may potentially be omitted from the receiving device, e.g., since the pre-processing may be no longer required, for example, when offloading the packet coalescing from the receiving device to the transmitting device.

Figure 4:
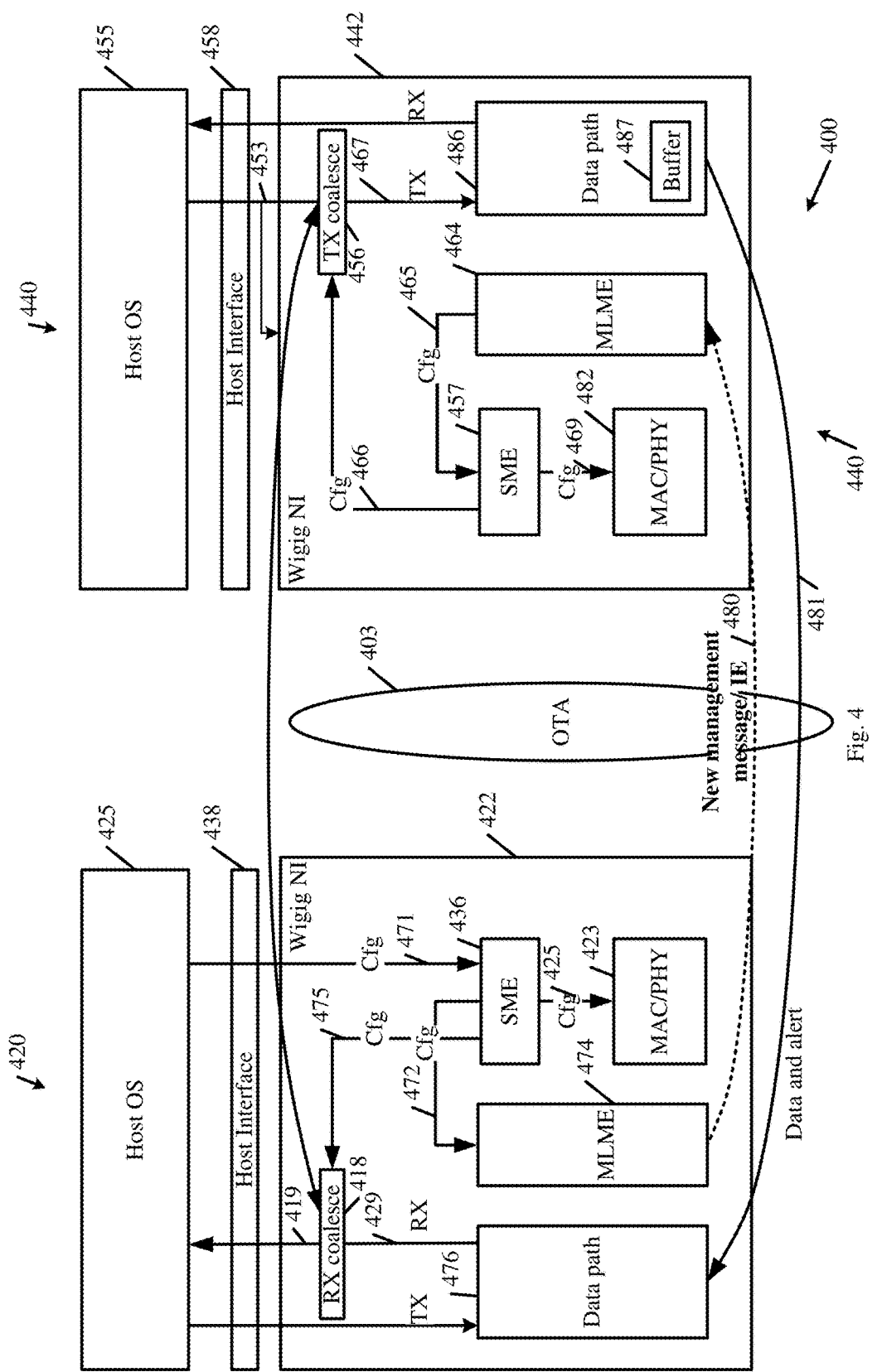
FIG. 4 is a schematic block diagram illustration of a system, in accordance with some demonstrative embodiments.

Reference is made to FIG. 4, which schematically illustrates a system 400, in accordance with some demonstrative embodiments. For example, one or more elements of system 400 may perform one or more operations and/or functionalities of one or more elements of system 100 (FIG. 1).

In some demonstrative embodiments, system 400 may include a wireless communication device 420 ("advertizing device" or "receiving device") to communicate with a wireless communication device 440 (peer node" or "transmitting device"). For example, wireless communication device 102 (FIG. 1) may perform one or more operations and/or functionalities of device 420, and/or wireless communication device 140 (FIG. 1) may perform one or more operations and/or functionalities of device 440.

In some demonstrative embodiments, device 420 may include a host OS 425, a network interface 422, and/or a host interface 438 to interface between host OS 425 and network interface 422. For example, host OS 425 may perform the functionality of OS 125 (FIG. 1), network interface 422 may perform the functionality of network interface 122 (FIG. 1) and/or host interface 438 may perform the functionality of host interface 138 (FIG. 1).

In some demonstrative embodiments, device 440 may include a host OS 455, a network interface 442, and/or a host interface 458 to interface between host OS 455 and network interface 442. For example, host OS 455 may perform the functionality of OS 155 (FIG. 1), network interface 442 may perform the functionality of network interface 142 (FIG. 1) and/or host interface 458 may perform the functionality of host interface 158 (FIG. 1).

As shown in FIG. 4, device 420 and device 440 may communicate over a wireless network 403.

In some demonstrative embodiments, wireless network interface 422 may include an SME 436 configured to manage one or more operations of network interface 422; a Media Access Control (MAC) Layer Management Entity (MLME) 474 to manage one or more operations of a MAC layer of network interface 422; a data path 476 to receive from OS 425 one or more frames to be transmitted via wireless network 403 and/or to provide to OS 425 one or more frames 419 received from wireless network 403; and/or a MAC/PHY module 423 to communicate via wireless network 403. For example, SME 436 may perform the functionality of SME 136 (FIG. 1), and/or MAC/PHY module 423 may perform the functionality of radio 124 (FIG. 1).

In some demonstrative embodiments, wireless network interface 422 may include an RX coalescing module 418 configured to coalesce frames 429 received from wireless network 403 and to provide packets 419 to OS 425, for example, if device 420 implements an RX coalescing filter. For example, RX filter coalescing 418 may perform the functionality of RX filter module 137 (FIG. 1).

In some demonstrative embodiments, wireless network interface 442 may include an SME 457 configured to manage one or more operations of network interface 442, an MLME 464 to manage one or more operations of a MAC layer of network interface 442, a data path 486 to receive from OS 455 one or more packets 453 to be transmitted via wireless network 403; and/or a MAC/PHY module 482 to communicate via wireless network 403. For example, SME 457 may perform the functionality of SME 157 (FIG. 1), and/or MAC/PHY module 482 may perform the functionality of radio 144 (FIG. 1) and/or MAC processor 152 (FIG. 1).

In some demonstrative embodiments, wireless network interface 442 may include a TX coalescing module 456 configured to coalesce one or more packets 453 from OS 455, and to trigger transmission of one or more buffered packets 467 of packets 453 via wireless network 403. For example, TX filter module 456 may perform the functionality of TX filter module 156 (FIG. 1).

In some demonstrative embodiments, OS 425 may generate Rx packet coalescing information defining one or more packet types of Rx packets to be coalesced for processing by OS 425, and a coalescing threshold indicator to indicate the coalescing threshold to limit the packet coalescing.

In some demonstrative embodiments, device 420 may switch from the active power state to the power save state and/or may change the RX coalescing information of device 420.

In some demonstrative embodiments, OS 425 may provide an indication to SME 436, e.g., via interface 438, of the switching of device 420 from the active power state to the power save state and/or the change of the RX coalescing information of device 420.

In some demonstrative embodiments, OS 425 may configure (471) SME 436 with the RX coalescing information of device 420.

In some demonstrative embodiments, as shown in FIG. 4, SME 436 may configure (472) MLME 474, and/or may configure (475) RX coalescing module 418, for example, according to the RX coalescing information from OS 425, including the packet type information and the coalescing threshold indicator to indicate a coalescing threshold, for example, to prevent from one or more "non-allowed" frames of frames 429 to be provided to OS 425, for example, upon a failure of device 440 to coalesce packets 453 for device 420.

In some demonstrative embodiments, as shown in FIG. 4, SME 436 may generate a notification 480, for example, in the form of a PPSA IE, including the Tx packet coalescing information, e.g., including the packet type information and the coalescing threshold indicator.

In some demonstrative embodiments, as shown in FIG. 4, device 420 may transmit notification 480 to device 440 via wireless network 403.

In some demonstrative embodiments, as shown in FIG. 4, MLME 464 may receive notification 480 and may provide (465) the Tx packet coalescing information to SME 457.

In some demonstrative embodiments, as shown in FIG. 4, SME 457 may configure (466) Tx filter coalescing module 456 according to the Tx packet coalescing information, for example, upon receipt of notification 480.

In some demonstrative embodiments, as shown in FIG. 4, Tx filter coalescing module 456 may configure data path 486 according to the Tx packet coalescing information, for example, based on notification 480.

In some demonstrative embodiments, as shown in FIG. 4, TX data path 486 may buffer packets in a buffer 487, which may be, for example, targeted to device 420 and may have a packet type, which matches the one or more packet types, e.g., defined by notification 480, for example, even without having device 440 send any notification to device 420.

In some demonstrative embodiments, Tx filter module 456 may selectively buffer the packets in the buffer 487, for example, based on a comparison between a packet type of a packet and the one or more packet types indicated by notification 480.

In some demonstrative embodiments, TX data path 486 may notify (481) device 420 for an availability of buffered frames in buffer 487, for example, based on one or more conditions, criteria and/or scenarios, e.g., a described below.

In some demonstrative embodiments, TX data path 486 may notify (481) device 420 for the availability of buffered frames, for example, if the coalescing threshold, e.g., as defined by notification 480, is reached.

In some demonstrative embodiments, TX data path 486 may notify (481) device 420 for the availability of buffered frames, for example, if a packet having a packet type, which is not included in the one or more packet types defined by notification 480, is available for device 420.

In some demonstrative embodiments, device 420 may switch from the power save state to the active power state.

In some demonstrative embodiments, SME 457 may terminate the packet coalescing for device 420, e.g., by resetting (466) Tx coalescing module 456, for example, if device 440 receives a subsequent notification with the power state indicator indicating device 420 is at the active power state, or a notification with the TX coalescing information including null values.

Figure 5:
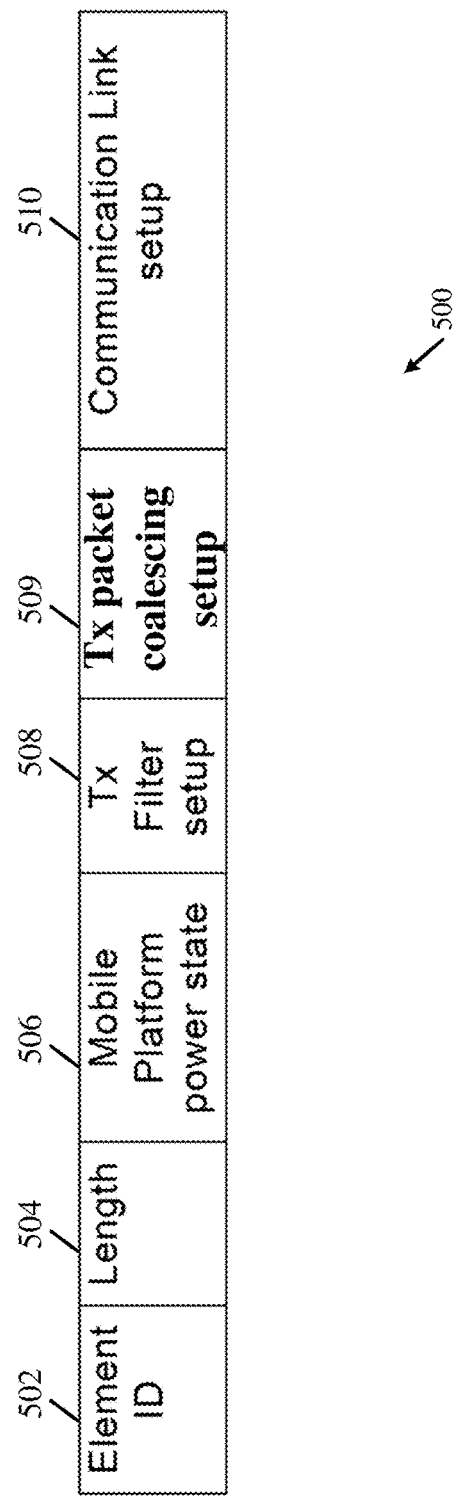
FIG. 5 is a schematic block diagram illustration of an information element (IE), in accordance with some demonstrative embodiments.

Reference is made to FIG. 5, which schematically illustrates an IE 500, in accordance with some demonstrative embodiments. For example, message processor 139 (FIG. 1) may generate IE 500, and/or device 102 (FIG. 1) may transmit a notification, e.g., notification 480 (FIG. 4), including IE 500. For example, message processor 159 (FIG. 1) may process IE 500, for example, when device 140 (FIG. 1) receives a notification, e.g., notification 480 (FIG. 4), including IE 500.

As shown in FIG. 5, IE 500 may include an Element ID field 502, a Length Field 504, a power state field 506, a Tx filter setup field 508, a TX packet coalescing setup field 509, and/or a communication link setup field 510. In other embodiments, IE 500 may include one or more other additional or alternative fields.

In some demonstrative embodiments, device 102 (FIG. 1) may generate Tx filter setup field 508 to include the one or more packet types for packet coalescing, e.g., to be coalesced for device 102 (FIG. 1) at device 140 (FIG. 1).

In some demonstrative embodiments, device 102 (FIG. 1) may generate communication link setup field 510 to include communication link setup information defining a wireless communication link to communicate with wireless communication device 102 (FIG. 1) during the power save state of device 102 (FIG. 1). For example, the communication link setup information may define wireless communication link 135 (FIG. 1) to communicate with wireless communication device 102 (FIG. 1) during the power save state.

In some demonstrative embodiments, power state indicator field 506 may indicate a power state of device 102 (FIG. 1). For example, the power state indicator may be set to a first value to indicate the power save state, or to a second value to indicate the active power state, of device 102 (FIG. 1).

In one example, controller 134 (FIG. 1) may set the power state indicator in field 206 to a first predefined value, e.g., "0", to indicate the power save state, for example, if device 102 is to switch to the power save state.

In another example, controller 134 (FIG. 1) may set the power state indicator in field 206 to a second predefined value, e.g., "1", to indicate the active power state, for example, if device 102 is to switch to the active power state.

In some demonstrative embodiments, device 102 (FIG. 1) may generate the Tx packet coalescing setup field 509 to include one or more fields, e.g., as described below.

In some demonstrative embodiments, the Tx packet coalescing setup field 509 may include a header type field, e.g., as may be required for Tx filter setup.

In some demonstrative embodiments, the Tx packet coalescing setup field 509 may include a header revision field, e.g., as may be required for Tx filter setup.

In some demonstrative embodiments, the Tx packet coalescing setup field 509 may include a header size field, e.g., as may be required for Tx filter setup.

In some demonstrative embodiments, the Tx packet coalescing setup field 509 may include a coalescing threshold field, for example, including an indication of a coalescing threshold to be applied for packet coalescing at device 140 (FIG. 1), e.g., the coalescing time threshold or the coalescing size threshold, e.g., as described above.

Figure 6:
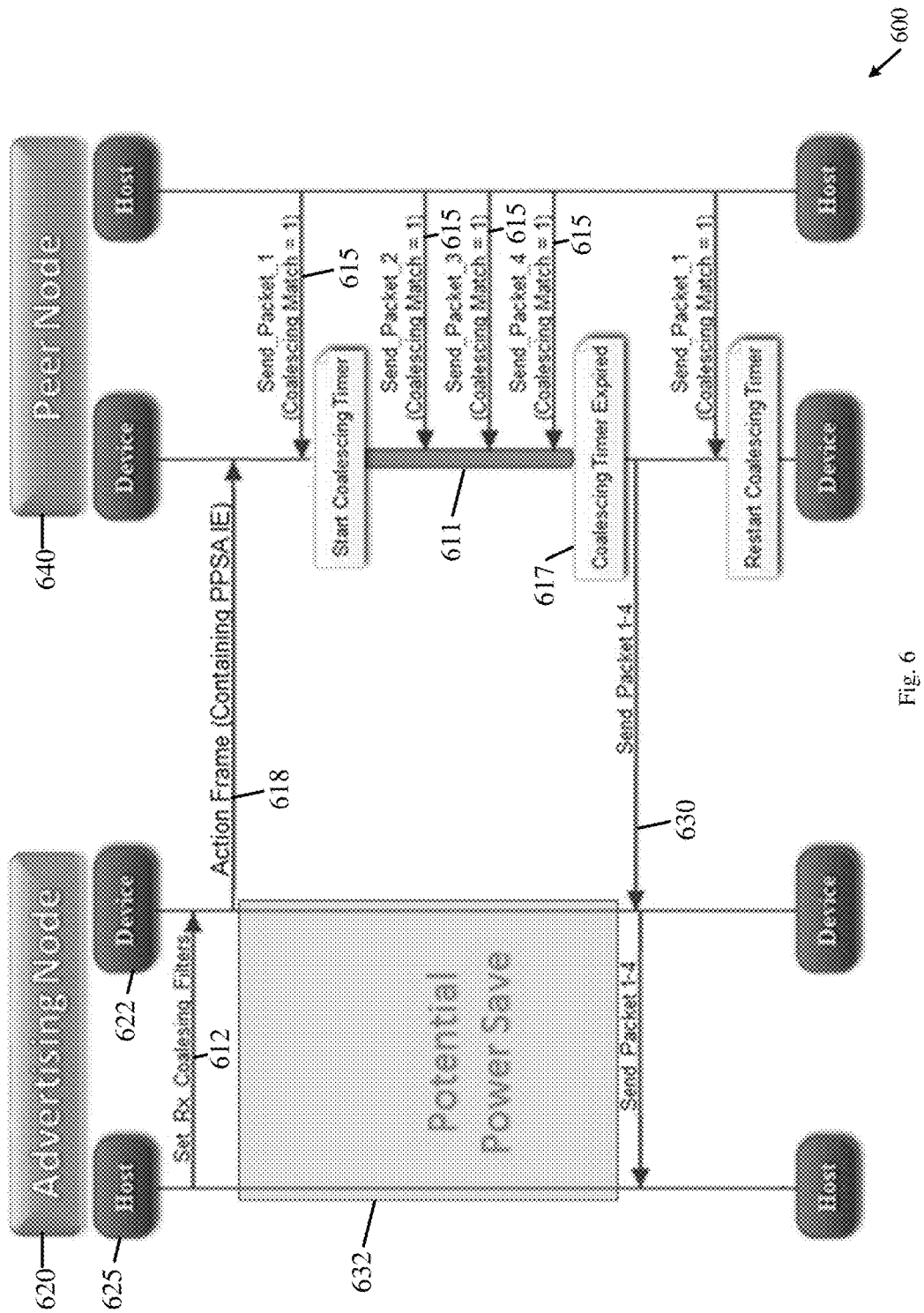
FIG. 6 is a schematic sequence diagram of operations and interactions between a first wireless communication device and a second wireless communication device, in accordance with some demonstrative embodiments.

Reference is made to FIG. 6, which schematically illustrates a sequence diagram 600 of operations and interactions between a first wireless communication device 620 ("advertizing node" or "receiving node") and a second wireless communication device 640 (peer node" or "transmitting node"), in accordance with some demonstrative embodiments. For example, wireless communication device 102 (FIG. 1) may perform one or more operations and/or functionalities of device 620, and/or wireless communication device 140 (FIG. 1) may perform one or more operations and/or functionalities of device 640.

In some demonstrative embodiments, a host 625 of device 620, e.g., the OS of device 620, may define Rx packet coalescing information 612 to define one or more packet types of Rx packets to be coalesced for processing by the OS 625, and a coalescing threshold to limit coalescing of the Rx packets.

In some demonstrative embodiments, as shown in FIG. 6, host 625 may send the Rx packet coalescing information 612 to a wireless communication interface 622 of the device 620.

In some demonstrative embodiments, the Rx packet coalescing information 612 may include the one or more packet types of Rx packets to be coalesced for processing by host 625, and the coalescing threshold to limit coalescing of the Rx packets.

In some demonstrative embodiments, as shown in FIG. 6, device 620 may transmit a frame, e.g., an action frame, including a PPSA IE 618, which may include Tx packet coalescing information, which may be based on the packet type information and the coalescing threshold of Rx packet coalescing information 612.

In some demonstrative embodiments, as shown in FIG. 6, device 640 may receive the PPSA IE 618.

In some demonstrative embodiments, device 640 may configure a Tx coalescing module, for example, based on the Tx packet coalescing information in IE 618.

In some demonstrative embodiments, as shown in FIG. 6, device 640 may coalesce a plurality of packets 615 for device 620, e.g., according to the Tx packet coalescing information in IE 618.

In some demonstrative embodiments, as shown in FIG. 6, the plurality of packets 615 may be buffered at device 620, for example, if packets 615 are of one or more types matching the one or more packet types according to the Tx packet coalescing information in IE 618, e.g., coalescing match=1.

In some demonstrative embodiments, as shown in FIG. 6, the plurality of packets 615 may have at least one of the one or more packet types, e.g., coalescing match=1.

In some demonstrative embodiments, as shown in FIG. 6, the plurality of packets 615 may be buffered during a time period 611, which is based on the coalescing threshold according to the Tx packet coalescing information in IE 618.

In some demonstrative embodiments, as shown in FIG. 6, device 640 may transmit at least one transmission 630 including the plurality of packets 615, for example, upon reaching the coalescing threshold, e.g., upon expiration 617 of time period 611.

In some demonstrative embodiments, as shown in FIG. 6, device 640 may transmit the transmissions 630 including the plurality of packets 615, for example, upon expiration 617 of the time period 611, for example, when no packet having a packet type, which is not included in the one or more packet types according to the Tx packet coalescing information in IE 618 (e.g., coalescing match=0), is available for device 620 prior to the expiration 617 of time period 611.

As shown in FIG. 6, interface 622 may receive the one or more transmissions 630 including the plurality of packets 615, and may send the plurality of packets 615 to the host 625 of device 620.

In some demonstrative embodiments, as shown in FIG. 6, device 620 may be allowed to be in a power save mode, for example, during a time period 632 between transmission of PPSA IE 618 and processing of the plurality of packets 615.

In some demonstrative embodiments, as shown in FIG. 6, both wireless network interface 622 and host 625 of device 620 may be allowed to be in the power save mode during time period 632, which may be longer than a time period, for example, when utilizing an Rx coalescing filter mechanism. For example, as discussed above with reference to FIG. 3, only the host, e.g., host 325 (FIG. 3) may be allowed to be in the power save mode, while device 302 (FIG. 3) and/or wireless communication interface 322 (FIG. 3) may be required to remain in an active state, e.g., to receive and process each incoming packet 305 (FIG. 3).

Figure 7:
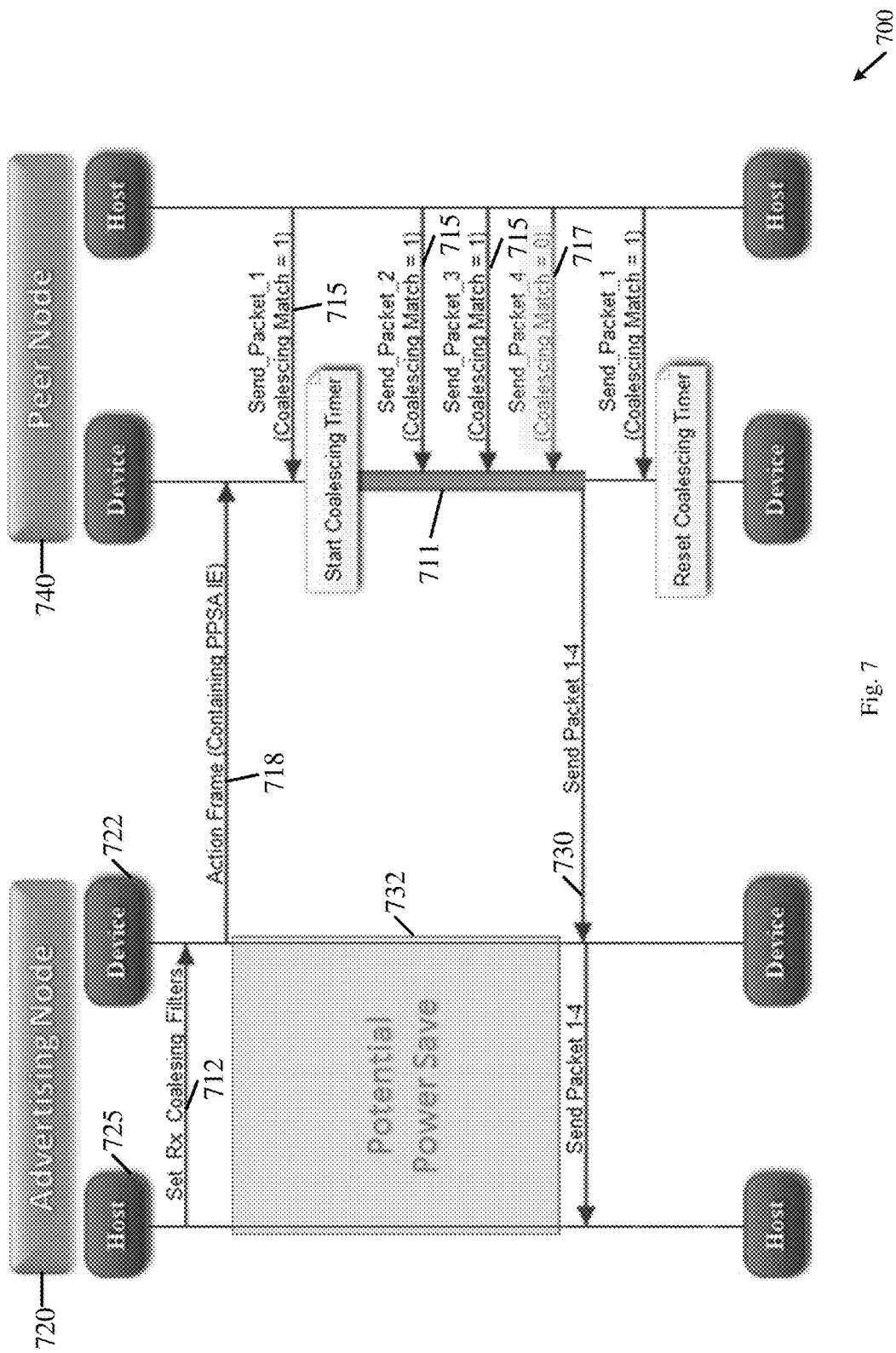
FIG. 7 is a schematic sequence diagram of operations and interactions between a first wireless communication device and a second wireless communication device, in accordance with some demonstrative embodiments.

Reference is made to FIG. 7, which schematically illustrates a sequence diagram 700 of operations and interactions between a first wireless communication device 720 ("advertizing node" or "receiving node") and a second wireless communication device 740 (peer node" or "transmitting node"), in accordance with some demonstrative embodiments. For example, wireless communication device 102 (FIG. 1) may perform one or more operations and/or functionalities of device 720, and/or wireless communication device 140 (FIG. 1) may perform one or more operations and/or functionalities of device 740.

In some demonstrative embodiments, a host 725 of device 720, e.g., the OS of device 720, may define Rx packet coalescing information 712 to define one or more packet types of Rx packets to be coalesced for processing by the OS 725, and a coalescing threshold to limit coalescing of the Rx packets.

In some demonstrative embodiments, as shown in FIG. 7, host 725 may send the Rx packet coalescing information 712 to a wireless communication interface 722 of the device 720.

In some demonstrative embodiments, the Rx packet coalescing information 712 may include the one or more packet types of Rx packets to be coalesced for processing by host 725, and the coalescing threshold to limit coalescing of the Rx packets.

In some demonstrative embodiments, as shown in FIG. 7, device 720 may transmit a frame, e.g., an action frame, including a PPSA IE 718, which may include Tx packet coalescing information, which may be based on the packet type information and the coalescing threshold of Rx packet coalescing information 712.

In some demonstrative embodiments, as shown in FIG. 7, device 740 may receive the PPSA IE 718.

In some demonstrative embodiments, device 740 may configure a Tx coalescing module, for example, based on the Tx packet coalescing information in IE 718.

In some demonstrative embodiments, as shown in FIG. 7, device 740 may coalesce a plurality of packets 715 for device 720, e.g., according to the Tx packet coalescing information in IE 718.

In some demonstrative embodiments, as shown in FIG. 7, the plurality of packets 715 may be buffered at device 720, for example, if packets 715 are of one or more types matching the one or more packet types according to the Tx packet coalescing information in IE 718, e.g., coalescing match=1.

In some demonstrative embodiments, as shown in FIG. 7, the plurality of packets 715 may have at least one of the one or more packet types, e.g., coalescing match=1.

In some demonstrative embodiments, as shown in FIG. 7, the plurality of packets 715 may be buffered during a time period 711, which is based on the coalescing threshold according to the Tx packet coalescing information in IE 718.

In some demonstrative embodiments, as shown in FIG. 7, a packet 717 having a packet type, which is not included in the one or more packet types according to the Tx packet coalescing information in IE 718 (e.g., coalescing match=0), may be available for device 720, for example, prior to expiration of time period 711.

In some demonstrative embodiments, as shown in FIG. 7, device 740 may transmit at least one transmission 730 including the packet 717 and the plurality of packets 715, for example, upon reception of packet 717 and before the expiration of time period 711.

In some demonstrative embodiments, as shown in FIG. 7, device 740 may transmit the transmission 730 including the packet 717 and the plurality of packets 715, for example, when packet 717 is available, for example, if packet 717 has a packet type, which is not included in the one or more packet types, e.g., when coalescing match=0.

As shown in FIG. 7, interface 722 may receive transmission 730 including the packet 717 and the plurality of packets 715, and may send the packet 717 and the plurality of packets 715 to the host 725 of device 720.

In some demonstrative embodiments, as shown in FIG. 7, device 720 may be allowed to be in a power save mode, for example, during a time period 732 between transmission of PPSA IE 718 and processing of the packet 717 and the plurality of packets 715 from device 740.

Figure 8:
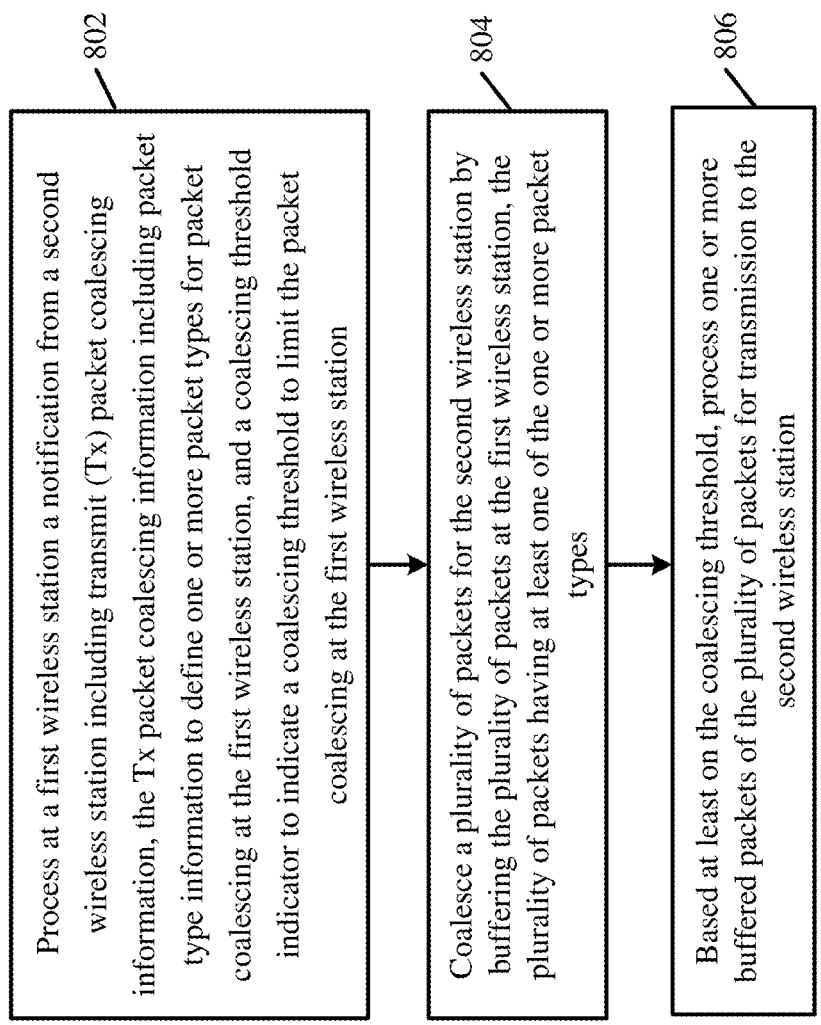
FIG. 8 is a schematic flow chart illustration of a method of packet coalescing, in accordance with some demonstrative embodiments.

Reference is now made to FIG. 8, which schematically illustrates a method of packet coalescing, in accordance with some demonstrative embodiments. For example, one or more of the operations of the method of FIG. 8 may be performed by a wireless communication system, e.g., system 100 (FIG. 1); a wireless communication device, e.g., devices 102 and/or 140 (FIG. 1); a controller, e.g., controllers 134 and/or 154 (FIG. 1); an SME, e.g., SMEs 136 and/or 157 (FIG. 1); a coalescing module, e.g., coalescing modules 137 and/or 156 (FIG. 1); a MAC processor, e.g., MAC processor 152 (FIG. 1); a transmitter, e.g., transmitter 128 (FIG. 1), and/or transmitter 148 (FIG. 1); a receiver, e.g., receiver 126 (FIG. 1), and/or receiver 146 (FIG. 1); a message processor, e.g., message processor 139 (FIG. 1), and/or message processor 159 (FIG. 1), and/or a wireless network interface, e.g., wireless network interfaces 124 and/or 144 (FIG. 1).

As indicated at block 802, the method may include processing at a first wireless station a notification from a second wireless station including transmit Tx packet coalescing information, the Tx packet coalescing information including packet type information to define one or more packet types for packet coalescing at the first wireless station, and a coalescing threshold indicator to indicate a coalescing threshold to limit the packet coalescing at the first wireless station. For example, controller 154 (FIG. 1) may process the notification from device 102 (FIG. 1), e.g., notification 480 (FIG. 4), including the Tx packet coalescing information including the packet type information and the coalescing threshold, e.g., as described above.

As indicated at block 804, the method may include coalescing a plurality of packets for the second wireless station by buffering the plurality of packets at the first wireless station, the plurality of packets having at least one of the one or more packet types. For example, controller 154 (FIG. 1) may coalesce the plurality of packets for device 102 (FIG. 1) having the at least one of the one or more packet types, for example, by buffering the plurality of packets at device 140 (FIG. 1), e.g., as described above.

As indicated at block 806, the method may include, based at least on the coalescing threshold, processing one or more buffered packets of the plurality of packets for transmission to the second wireless station. For example, controller 154 (FIG. 1) may process the one or more buffered packets of the plurality of packets for transmission to device 102 (FIG. 1), e.g., as described above.

Figure 9:
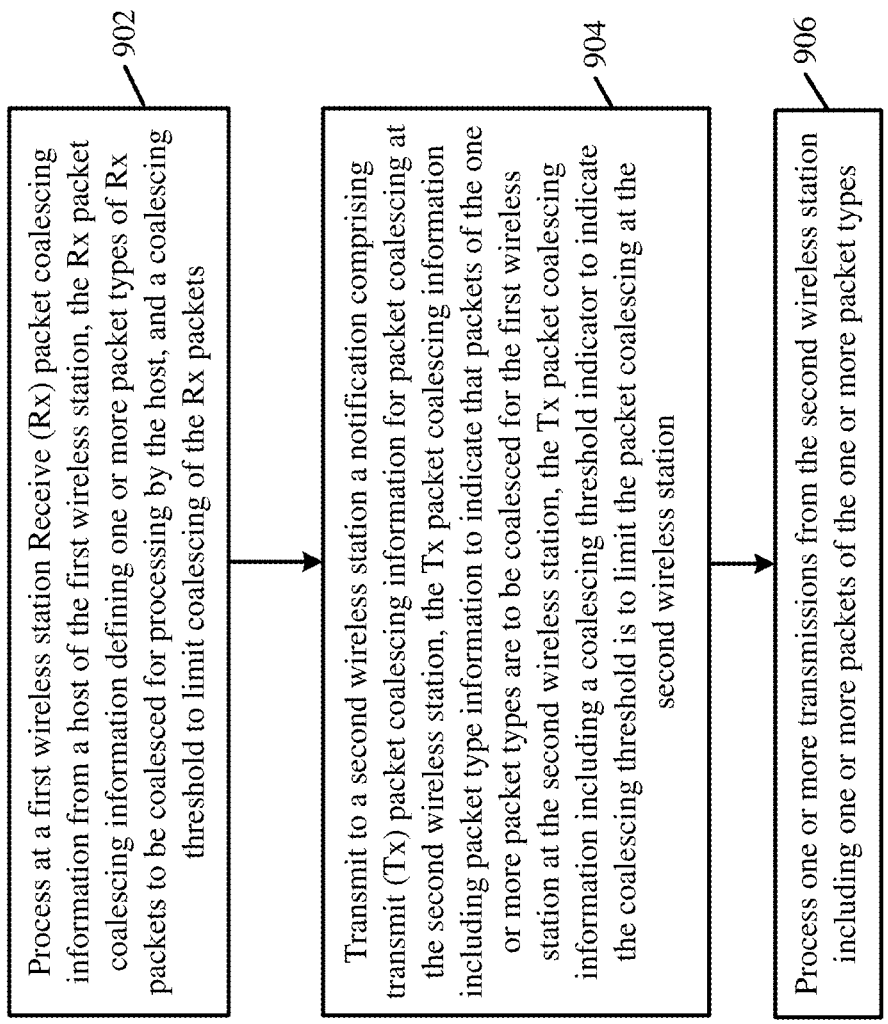
FIG. 9 is a schematic flow chart illustration of a method of packet coalescing, in accordance with some demonstrative embodiments.

Reference is now made to FIG. 9, which schematically illustrates a method of packet coalescing, in accordance with some demonstrative embodiments. For example, one or more of the operations of the method of FIG. 9 may be performed by a wireless communication system, e.g., system 100 (FIG. 1); a wireless communication device, e.g., devices 102 and/or 140 (FIG. 1); a controller, e.g., controllers 134 and/or 154 (FIG. 1); an SME, e.g., SMEs 136 and/or 157 (FIG. 1); a coalescing module, e.g., coalescing modules 137 and/or 156 (FIG. 1); a MAC processor, e.g., MAC processor 152 (FIG. 1); a transmitter, e.g., transmitter 128 (FIG. 1), and/or transmitter 148 (FIG. 1); a receiver, e.g., receiver 126 (FIG. 1), and/or receiver 146 (FIG. 1); a message processor, e.g., message processor 139 (FIG. 1), and/or message processor 159 (FIG. 1), and/or a wireless network interface, e.g., wireless network interfaces 124 and/or 144 (FIG. 1).

As indicated at block 902, the method may include processing at a first wireless station Rx packet coalescing information from a host of the first wireless station, the Rx packet coalescing information defining one or more packet types of Rx packets to be coalesced for processing by the host, and a coalescing threshold to limit coalescing of the Rx packets. For example, controller 134 (FIG. 1) may process Rx packet coalescing information from OS 125 (FIG. 1), the Rx packet coalescing information defining the one or more packet types, and the coalescing threshold, e.g., as described above.

As indicated at block 904, the method may include transmitting to a second wireless station a notification including Tx packet coalescing information for packet coalescing at the second wireless station, the Tx packet coalescing information including packet type information to indicate that packets of the one or more packet types are to be coalesced for the first wireless station at the second wireless station, the Tx packet coalescing information including a coalescing threshold indicator to indicate the coalescing threshold is to limit the packet coalescing at the second wireless station. For example, controller 134 (FIG. 1) may control, cause and/or trigger device 102 (FIG. 1) to transmit to device 140 (FIG. 1) the notification, e.g., notification 480 (FIG. 4), including the Tx packet coalescing information including the packet type information and the coalescing threshold indicator to indicate the coalescing threshold, for example, based on the Rx packet coalescing information from IS 125 (FIG. 1), e.g., as described above.

As indicated at block 906, the method may include processing one or more transmissions from the second wireless station including one or more packets of the one or more packet types. For example, controller 134 (FIG. 1) may cause device 102 (FIG. 1) to process the one or more buffered packets from device 140 (FIG. 1), e.g., as described above.

Figure 10:
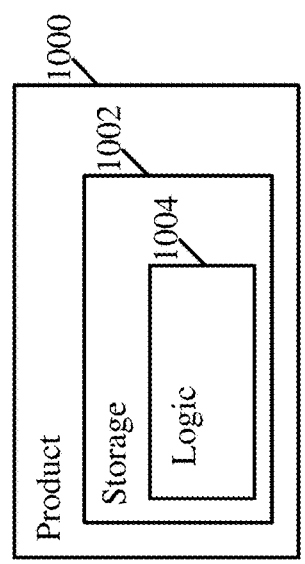
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at device 102 (FIG. 1), device 140 (FIG. 1), radio 124 (FIG. 1), radio 144 (FIG. 1), transmitter 128 (FIG. 1), transmitter 148 (FIG. 1), receiver 126 (FIG. 1), receiver 146 (FIG. 1), controller 134 (FIG. 1), controller 154 (FIG. 1), SMEs 136 and/or 157 (FIG. 1), coalescing modules 137 and/or 156 (FIG. 1), MAC processor 152 (FIG. 1), message processor 139 (FIG. 1), and/or message processor 159 (FIG. 1), and/or to cause device 102 (FIG. 1), device 140 (FIG. 1), radio 124 (FIG. 1), radio 144 (FIG. 1), transmitter 128 (FIG. 1), transmitter 148 (FIG. 1), receiver 126 (FIG. 1), receiver 146 (FIG. 1), controller 134 (FIG. 1), controller 154 (FIG. 1), SMEs 136 and/or 157 (FIG. 1), coalescing modules 137 and/or 156 (FIG. 1), MAC processor 152 (FIG. 1), message processor 139 (FIG. 1), and/or message processor 159 (FIG. 1), to perform one or more operations, and/or to perform, trigger and/or implement one or more operations, communications and/or functionalities described above with reference to FIGS. 1, 2, 3, 4, 5, 6, 7, 8, and/or 9, and/or one or more operations described herein. The phrase "non-transitory machine-readable medium" is directed to include all computer-readable media, with the sole exception being a transitory propagating signal.

In some demonstrative embodiments, product 1000 and/or storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless station to process a notification from a second wireless station comprising transmit (Tx) packet coalescing information, the Tx packet coalescing information comprising packet type information to define one or more packet types for packet coalescing at the first wireless station, and a coalescing threshold indicator to indicate a coalescing threshold to limit the packet coalescing at the first wireless station; coalesce a plurality of packets for the second wireless station by buffering the plurality of packets at the first wireless station, the plurality of packets having at least one of the one or more packet types; and based at least on the coalescing threshold, process one or more buffered packets of the plurality of packets for transmission to the second wireless station.

Example 2 includes the subject matter of Example 1, and optionally, wherein the apparatus is configured to cause the first wireless station to, upon reaching the coalescing threshold, process the one or more buffered packets for transmission to the second wireless station.

Example 3 includes the subject matter of Example 1 or 2, and optionally, wherein the apparatus is configured to cause the first wireless station to process the one or more buffered packets for transmission to the second wireless station at a latest of a packet having a packet type, which is not included in the one or more packet types, is available for the second wireless station; and reaching the coalescing threshold.

Example 4 includes the subject matter of any one of Examples 1-3, and optionally, wherein the apparatus is configured to cause the first wireless station to process the one or more buffered packets for transmission to the second wireless station only upon reaching the coalescing threshold, when no packet having a packet type, which is not included in the one or more packet types, is available for the second wireless station prior to reaching the coalescing threshold.

Example 5 includes the subject matter of any one of Examples 1-4, and optionally, wherein the apparatus is configured to cause the first wireless station to process the one or more buffered packets for transmission to the second wireless station upon processing a packet for the second wireless station, the packet having a packet type, which is not included in the one or more packet types.

Example 6 includes the subject matter of any one of Examples 1-5, and optionally, wherein the notification comprises a power save indication to indicate a power save state of the second wireless station.

Example 7 includes the subject matter of Example 6, and optionally, wherein the apparatus is configured to cause the first wireless station to initiate packet coalescing for the second wireless station based on the power save indication, and to terminate the packet coalescing for the second wireless station upon receipt of a subsequent notification from the second wireless station, the subsequent notification comprising a power active indication to indicate a power active state of the second wireless station.

Example 8 includes the subject matter of any one of Examples 1-7, and optionally, comprising a buffer to buffer the plurality of packets, and a Tx coalescing module configured to selectively buffer a packet in the buffer based on a comparison between a packet type of the packet and the one or more packet types.

Example 9 includes the subject matter of Example 8, and optionally, comprising a Station Management Entity (SME) configured to process the notification from the second wireless station, and to configure the Tx coalescing module based on the Tx packet coalescing information.

Example 10 includes the subject matter of Example 8 or 9, and optionally, comprising a Media Access Control (MAC) processor, the Tx coalescing module to provide the one or more buffered packets to the MAC processor based at least on the coalescing threshold.

Example 11 includes the subject matter of any one of Examples 1-10, and optionally, wherein the coalescing threshold comprises at least one of a coalescing time threshold or a coalescing size threshold, the coalescing time threshold to limit a time period to buffer the plurality of packets, the coalescing size threshold to limit a total size of the plurality of packets.

Example 12 includes the subject matter of any one of Examples 1-11, and optionally, wherein the apparatus is configured to cause the first wireless station to transmit the one or more buffered packets within a same Transmit Opportunity (TxOP).

Example 13 includes the subject matter of any one of Examples 1-12, and optionally, wherein the apparatus is configured to cause the first wireless station to transmit an aggregate transmission comprising the one or more buffered packets.

Example 14 includes the subject matter of any one of Examples 1-13, and optionally, wherein the one or more buffered packets to be processed for transmission to the second wireless station comprise all of the plurality of packets.

Example 15 includes the subject matter of any one of Examples 1-13, and optionally, wherein the one or more buffered packets to be processed for transmission to the second wireless station comprise only some of the plurality of packets.

Example 16 includes the subject matter of any one of Examples 1-15, and optionally, wherein the notification comprises a Platform Power State Advertising (PPSA) Information Element (IE) comprising a first field comprising a power indication to indicate a power save state of the second wireless station, and at least one second field comprising the Tx packet coalescing information.

Example 17 includes the subject matter of any one of Examples 1-16, and optionally, comprising a radio to receive the notification, and to transmit the one or more buffered packets.

Example 18 includes the subject matter of any one of Examples 1-17, and optionally, comprising one or more antennas, a memory and a processor.

Example 19 includes a system of wireless communication comprising a first wireless station, the first wireless station comprising one or more antennas; a radio; a processor; a memory; and a controller configured to cause the first wireless station to process a notification from a second wireless station comprising transmit (Tx) packet coalescing information, the Tx packet coalescing information comprising packet type information to define one or more packet types for packet coalescing at the first wireless station, and a coalescing threshold indicator to indicate a coalescing threshold to limit the packet coalescing at the first wireless station; coalesce a plurality of packets for the second wireless station by buffering the plurality of packets at the first wireless station, the plurality of packets having at least one of the one or more packet types; and based at least on the coalescing threshold, process one or more buffered packets of the plurality of packets for transmission to the second wireless station.

Example 20 includes the subject matter of Example 19, and optionally, wherein the controller is configured to cause the first wireless station to, upon reaching the coalescing threshold, process the one or more buffered packets for transmission to the second wireless station.

Example 21 includes the subject matter of Example 19 or 20, and optionally, wherein the controller is configured to cause the first wireless station to process the one or more buffered packets for transmission to the second wireless station at a latest of a packet having a packet type, which is not included in the one or more packet types, is available for the second wireless station; and reaching the coalescing threshold.

Example 22 includes the subject matter of any one of Examples 19-21, and optionally, wherein the controller is configured to cause the first wireless station to process the one or more buffered packets for transmission to the second wireless station only upon reaching the coalescing threshold, when no packet having a packet type, which is not included in the one or more packet types, is available for the second wireless station prior to reaching the coalescing threshold.

Example 23 includes the subject matter of any one of Examples 19-22, and optionally, wherein the controller is configured to cause the first wireless station to process the one or more buffered packets for transmission to the second wireless station upon processing a packet for the second wireless station, the packet having a packet type, which is not included in the one or more packet types.

Example 24 includes the subject matter of any one of Examples 19-23, and optionally, wherein the notification comprises a power save indication to indicate a power save state of the second wireless station.

Example 25 includes the subject matter of Example 24, and optionally, wherein the controller is configured to cause the first wireless station to initiate packet coalescing for the second wireless station based on the power save indication, and to terminate the packet coalescing for the second wireless station upon receipt of a subsequent notification from the second wireless station, the subsequent notification comprising a power active indication to indicate a power active state of the second wireless station.

Example 26 includes the subject matter of any one of Examples 19-25, and optionally, wherein the first wireless station comprises a buffer to buffer the plurality of packets, and a Tx coalescing module configured to selectively buffer a packet in the buffer based on a comparison between a packet type of the packet and the one or more packet types.

Example 27 includes the subject matter of Example 26, and optionally, wherein the first wireless station comprises a Station Management Entity (SME) configured to process the notification from the second wireless station, and to configure the Tx coalescing module based on the Tx packet coalescing information.

Example 28 includes the subject matter of Example 26 or 27, and optionally, wherein the first wireless station comprises a Media Access Control (MAC) processor, the Tx coalescing module to provide the one or more buffered packets to the MAC processor based at least on the coalescing threshold.

Example 29 includes the subject matter of any one of Examples 19-28, and optionally, wherein the coalescing threshold comprises at least one of a coalescing time threshold or a coalescing size threshold, the coalescing time threshold to limit a time period to buffer the plurality of packets, the coalescing size threshold to limit a total size of the plurality of packets.

Example 30 includes the subject matter of any one of Examples 19-29, and optionally, wherein the controller is configured to cause the first wireless station to transmit the one or more buffered packets within a same Transmit Opportunity (TxOP).

Example 31 includes the subject matter of any one of Examples 19-30, and optionally, wherein the controller is configured to cause the first wireless station to transmit an aggregate transmission comprising the one or more buffered packets.

Example 32 includes the subject matter of any one of Examples 19-31, and optionally, wherein the one or more buffered packets to be processed for transmission to the second wireless station comprise all of the plurality of packets.

Example 33 includes the subject matter of any one of Examples 19-31, and optionally, wherein the one or more buffered packets to be processed for transmission to the second wireless station comprise only some of the plurality of packets.

Example 34 includes the subject matter of any one of Examples 19-33, and optionally, wherein the notification comprises a Platform Power State Advertising (PPSA) Information Element (IE) comprising a first field comprising a power indication to indicate a power save state of the second wireless station, and at least one second field comprising the Tx packet coalescing information.

Example 35 includes the subject matter of any one of Examples 19-34, and optionally, wherein the radio is to receive the notification, and to transmit the one or more buffered packets.

Example 36 includes a method to be performed by a first wireless station, the method comprising processing a notification from a second wireless station comprising transmit (Tx) packet coalescing information, the Tx packet coalescing information comprising packet type information to define one or more packet types for packet coalescing at the first wireless station, and a coalescing threshold indicator to indicate a coalescing threshold to limit the packet coalescing at the first wireless station; coalescing a plurality of packets for the second wireless station by buffering the plurality of packets at the first wireless station, the plurality of packets having at least one of the one or more packet types; and based at least on the coalescing threshold, processing one or more buffered packets of the plurality of packets for transmission to the second wireless station.

Example 37 includes the subject matter of Example 36, and optionally, comprising, upon reaching the coalescing threshold, processing the one or more buffered packets for transmission to the second wireless station.

Example 38 includes the subject matter of Example 36 or 37, and optionally, comprising processing the one or more buffered packets for transmission to the second wireless station at a latest of a packet having a packet type, which is not included in the one or more packet types, is available for the second wireless station; and reaching the coalescing threshold.

Example 39 includes the subject matter of any one of Examples 36-38, and optionally, comprising processing the one or more buffered packets for transmission to the second wireless station only upon reaching the coalescing threshold, when no packet having a packet type, which is not included in the one or more packet types, is available for the second wireless station prior to reaching the coalescing threshold.

Example 40 includes the subject matter of any one of Examples 36-39, and optionally, comprising processing the one or more buffered packets for transmission to the second wireless station upon processing a packet for the second wireless station, the packet having a packet type, which is not included in the one or more packet types.

Example 41 includes the subject matter of any one of Examples 36-40, and optionally, wherein the notification comprises a power save indication to indicate a power save state of the second wireless station.

Example 42 includes the subject matter of Example 41, and optionally, comprising initiating packet coalescing for the second wireless station based on the power save indication, and terminating the packet coalescing for the second wireless station upon receipt of a subsequent notification from the second wireless station, the subsequent notification comprising a power active indication to indicate a power active state of the second wireless station.

Example 43 includes the subject matter of any one of Examples 36-42, and optionally, comprising, providing the one or more buffered packets to a Media Access Control (MAC) processor based at least on the coalescing threshold.

Example 44 includes the subject matter of any one of Examples 36-43, and optionally, wherein the coalescing threshold comprises at least one of a coalescing time threshold or a coalescing size threshold, the coalescing time threshold to limit a time period to buffer the plurality of packets, the coalescing size threshold to limit a total size of the plurality of packets.

Example 45 includes the subject matter of any one of Examples 36-44, and optionally, comprising transmitting the one or more buffered packets within a same Transmit Opportunity (TxOP).

Example 46 includes the subject matter of any one of Examples 36-45, and optionally, comprising transmitting an aggregate transmission comprising the one or more buffered packets.

Example 47 includes the subject matter of any one of Examples 36-46, and optionally, wherein the one or more buffered packets to be processed for transmission to the second wireless station comprise all of the plurality of packets.

Example 48 includes the subject matter of any one of Examples 36-46, and optionally, wherein the one or more buffered packets to be processed for transmission to the second wireless station comprise only some of the plurality of packets.

Example 49 includes the subject matter of any one of Examples 36-48, and optionally, wherein the notification comprises a Platform Power State Advertising (PPSA) Information Element (IE) comprising a first field comprising a power indication to indicate a power save state of the second wireless station, and at least one second field comprising the Tx packet coalescing information.

Example 50 includes a product comprising one or more tangible computer-readable non-transitory storage media comprising computer-executable instructions operable to, when executed by at least one computer processor, enable the at least one computer processor to cause a first wireless station to process a notification from a second wireless station comprising transmit (Tx) packet coalescing information, the Tx packet coalescing information comprising packet type information to define one or more packet types for packet coalescing at the first wireless station, and a coalescing threshold indicator to indicate a coalescing threshold to limit the packet coalescing at the first wireless station; coalesce a plurality of packets for the second wireless station by buffering the plurality of packets at the first wireless station, the plurality of packets having at least one of the one or more packet types; and based at least on the coalescing threshold, process one or more buffered packets of the plurality of packets for transmission to the second wireless station.

Example 51 includes the subject matter of Example 50, and optionally, wherein the instructions, when executed, cause the first wireless station to, upon reaching the coalescing threshold, process the one or more buffered packets for transmission to the second wireless station.

Example 52 includes the subject matter of Example 50 or 51, and optionally, wherein the instructions, when executed, cause the first wireless station to process the one or more buffered packets for transmission to the second wireless station at a latest of a packet having a packet type, which is not included in the one or more packet types, is available for the second wireless station; and reaching the coalescing threshold.

Example 53 includes the subject matter of any one of Examples 50-52, and optionally, wherein the instructions, when executed, cause the first wireless station to process the one or more buffered packets for transmission to the second wireless station only upon reaching the coalescing threshold, when no packet having a packet type, which is not included in the one or more packet types, is available for the second wireless station prior to reaching the coalescing threshold.

Example 54 includes the subject matter of any one of Examples 50-53, and optionally, wherein the instructions, when executed, cause the first wireless station to process the one or more buffered packets for transmission to the second wireless station upon processing a packet for the second wireless station, the packet having a packet type, which is not included in the one or more packet types.

Example 55 includes the subject matter of any one of Examples 50-54, and optionally, wherein the notification comprises a power save indication to indicate a power save state of the second wireless station.

Example 56 includes the subject matter of Example 55, and optionally, wherein the instructions, when executed, cause the first wireless station to initiate packet coalescing for the second wireless station based on the power save indication, and to terminate the packet coalescing for the second wireless station upon receipt of a subsequent notification from the second wireless station, the subsequent notification comprising a power active indication to indicate a power active state of the second wireless station.

Example 57 includes the subject matter of any one of Examples 50-56, and optionally, wherein the instructions, when executed, cause the first wireless station to provide the one or more buffered packets to a Media Access Control (MAC) processor based at least on the coalescing threshold.

Example 58 includes the subject matter of any one of Examples 50-57, and optionally, wherein the coalescing threshold comprises at least one of a coalescing time threshold or a coalescing size threshold, the coalescing time threshold to limit a time period to buffer the plurality of packets, the coalescing size threshold to limit a total size of the plurality of packets.

Example 59 includes the subject matter of any one of Examples 50-58, and optionally, wherein the instructions, when executed, cause the first wireless station to transmit the one or more buffered packets within a same Transmit Opportunity (TxOP).

Example 60 includes the subject matter of any one of Examples 50-59, and optionally, wherein the instructions, when executed, cause the first wireless station to transmit an aggregate transmission comprising the one or more buffered packets.

Example 61 includes the subject matter of any one of Examples 50-60, and optionally, wherein the one or more buffered packets to be processed for transmission to the second wireless station comprise all of the plurality of packets.

Example 62 includes the subject matter of any one of Examples 50-60, and optionally, wherein the one or more buffered packets to be processed for transmission to the second wireless station comprise only some of the plurality of packets.

Example 63 includes the subject matter of any one of Examples 50-62, and optionally, wherein the notification comprises a Platform Power State Advertising (PPSA) Information Element (IE) comprising a first field comprising a power indication to indicate a power save state of the second wireless station, and at least one second field comprising the Tx packet coalescing information.

Example 64 includes an apparatus of a first wireless device, the apparatus comprising means for processing a notification from a second wireless station comprising transmit (Tx) packet coalescing information, the Tx packet coalescing information comprising packet type information to define one or more packet types for packet coalescing at the first wireless station, and a coalescing threshold indicator to indicate a coalescing threshold to limit the packet coalescing at the first wireless station; means for coalescing a plurality of packets for the second wireless station by buffering the plurality of packets at the first wireless station, the plurality of packets having at least one of the one or more packet types; and means for, based at least on the coalescing threshold, processing one or more buffered packets of the plurality of packets for transmission to the second wireless station.

Example 65 includes the subject matter of Example 64, and optionally, comprising means for, upon reaching the coalescing threshold, processing the one or more buffered packets for transmission to the second wireless station.

Example 66 includes the subject matter of Example 64 or 65, and optionally, comprising means for processing the one or more buffered packets for transmission to the second wireless station at a latest of a packet having a packet type, which is not included in the one or more packet types, is available for the second wireless station; and reaching the coalescing threshold.

Example 67 includes the subject matter of any one of Examples 64-66, and optionally, comprising means for processing the one or more buffered packets for transmission to the second wireless station only upon reaching the coalescing threshold, when no packet having a packet type, which is not included in the one or more packet types, is available for the second wireless station prior to reaching the coalescing threshold.

Example 68 includes the subject matter of any one of Examples 64-67, and optionally, comprising means for processing the one or more buffered packets for transmission to the second wireless station upon processing a packet for the second wireless station, the packet having a packet type, which is not included in the one or more packet types.

Example 69 includes the subject matter of any one of Examples 64-68, and optionally, wherein the notification comprises a power save indication to indicate a power save state of the second wireless station.

Example 70 includes the subject matter of any one of Examples 64-69, and optionally, comprising means for initiating packet coalescing for the second wireless station based on the power save indication, and terminating the packet coalescing for the second wireless station upon receipt of a subsequent notification from the second wireless station, the subsequent notification comprising a power active indication to indicate a power active state of the second wireless station.

Example 71 includes the subject matter of any one of Examples 64-70, and optionally, comprising buffer means to buffer the plurality of packets, and Tx coalescing means configured to selectively buffer a packet in the buffer means based on a comparison between a packet type of the packet and the one or more packet types.

Example 72 includes the subject matter of Example 71, and optionally, comprising Station Management Entity (SME) means configured to process the notification from the second wireless station, and to configure the Tx coalescing means based on the Tx packet coalescing information.

Example 73 includes the subject matter of Example 71 or 72, and optionally, comprising Media Access Control (MAC) processor means, the Tx coalescing means to provide the one or more buffered packets to the MAC processor means based at least on the coalescing threshold.

Example 74 includes the subject matter of any one of Examples 64-73, and optionally, wherein the coalescing threshold comprises at least one of a coalescing time threshold or a coalescing size threshold, the coalescing time threshold to limit a time period to buffer the plurality of packets, the coalescing size threshold to limit a total size of the plurality of packets.

Example 75 includes the subject matter of any one of Examples 64-74, and optionally, comprising means for transmitting the one or more buffered packets within a same Transmit Opportunity (TxOP).

Example 76 includes the subject matter of any one of Examples 64-75, and optionally, comprising means for transmitting an aggregate transmission comprising the one or more buffered packets.

Example 77 includes the subject matter of any one of Examples 64-76, and optionally, wherein the one or more buffered packets to be processed for transmission to the second wireless station comprise all of the plurality of packets.

Example 78 includes the subject matter of any one of Examples 64-76, and optionally, wherein the one or more buffered packets to be processed for transmission to the second wireless station comprise only some of the plurality of packets.

Example 79 includes the subject matter of any one of Examples 64-78, and optionally, wherein the notification comprises a Platform Power State Advertising (PPSA) Information Element (IE) comprising a first field comprising a power indication to indicate a power save state of the second wireless station, and at least one second field comprising the Tx packet coalescing information.

Example 80 includes an apparatus comprising circuitry and logic configured to cause a first wireless station to process Receive (Rx) packet coalescing information from a host of the first wireless station, the Rx packet coalescing information defining one or more packet types of Rx packets to be coalesced for processing by the host, and a coalescing threshold to limit coalescing of the Rx packets; transmit to a second wireless station a notification comprising transmit (Tx) packet coalescing information for packet coalescing at the second wireless station, the Tx packet coalescing information comprising packet type information to indicate that packets of the one or more packet types are to be coalesced for the first wireless station at the second wireless station, the Tx packet coalescing information comprising a coalescing threshold indicator to indicate the coalescing threshold is to limit the packet coalescing at the second wireless station; and process one or more transmissions from the second wireless station comprising one or more packets of the one or more packet types.

Example 81 includes the subject matter of Example 80, and optionally, wherein the one or more transmissions are based on the coalescing threshold.

Example 82 includes the subject matter of Example 80 or 81, and optionally, wherein the one or more transmissions are before the coalescing threshold is reached, only when the one or more transmissions include at least one packet of a packet type, which is not included in the one or more packet types.

Example 83 includes the subject matter of any one of Examples 80-82, and optionally, wherein the one or more transmissions are only when the coalescing threshold is reached, and the one or more transmissions include only packets of the one or more packet types.

Example 84 includes the subject matter of any one of Examples 80-83, and optionally, wherein the notification comprises a power save indication to indicate a power save state of the first wireless station.

Example 85 includes the subject matter of Example 84, and optionally, wherein the apparatus is configured to cause the first wireless station to indicate that the packet coalescing at the second wireless station is to be terminated by transmitting to the second wireless station a subsequent notification comprising a power active indication to indicate a power active state of the first wireless station.

Example 86 includes the subject matter of any one of Examples 80-85, and optionally, wherein the apparatus is configured to cause the first wireless station to transmit a subsequent notification to the second wireless station to terminate the packet coalescing at the second wireless station.

Example 87 includes the subject matter of any one of Examples 80-86, and optionally, wherein the notification comprises a Platform Power State Advertising (PPSA) Information Element (IE) comprising a first field comprising a power indication to indicate a power save state of the first wireless station, and at least one second field comprising the Tx packet coalescing information.

Example 88 includes the subject matter of any one of Examples 80-87, and optionally, wherein the coalescing threshold comprises at least one of a coalescing time threshold or a coalescing size threshold.

Example 89 includes the subject matter of any one of Examples 80-88, and optionally, comprising a radio to transmit the notification, and to process the one or more transmissions.

Example 90 includes the subject matter of any one of Examples 80-89, and optionally, comprising one or more antennas, a memory and a processor.

Example 91 includes a system of wireless communication comprising a first wireless station, the first wireless station comprising one or more antennas; a radio; a processor; a memory; and a controller configured to cause the first wireless station to process Receive (Rx) packet coalescing information from a host of the first wireless station, the Rx packet coalescing information defining one or more packet types of Rx packets to be coalesced for processing by the host, and a coalescing threshold to limit coalescing of the Rx packets; transmit to a second wireless station a notification comprising transmit (Tx) packet coalescing information for packet coalescing at the second wireless station, the Tx packet coalescing information comprising packet type information to indicate that packets of the one or more packet types are to be coalesced for the first wireless station at the second wireless station, the Tx packet coalescing information comprising a coalescing threshold indicator to indicate the coalescing threshold is to limit the packet coalescing at the second wireless station; and process one or more transmissions from the second wireless station comprising one or more packets of the one or more packet types.

Example 92 includes the subject matter of Example 91, and optionally, wherein the one or more transmissions are based on the coalescing threshold.

Example 93 includes the subject matter of Example 91 or 92, and optionally, wherein the one or more transmissions are before the coalescing threshold is reached, only when the one or more transmissions include at least one packet of a packet type, which is not included in the one or more packet types.

Example 94 includes the subject matter of any one of Examples 91-93, and optionally, wherein the one or more transmissions are only when the coalescing threshold is reached, and the one or more transmissions include only packets of the one or more packet types.

Example 95 includes the subject matter of any one of Examples 91-94, and optionally, wherein the notification comprises a power save indication to indicate a power save state of the first wireless station.

Example 96 includes the subject matter of Example 95, and optionally, wherein the controller is configured to cause the first wireless station to indicate that the packet coalescing at the second wireless station is to be terminated by transmitting to the second wireless station a subsequent notification comprising a power active indication to indicate a power active state of the first wireless station.

Example 97 includes the subject matter of any one of Examples 91-96, and optionally, wherein the controller is configured to cause the first wireless station to transmit a subsequent notification to the second wireless station to terminate the packet coalescing at the second wireless station.

Example 98 includes the subject matter of any one of Examples 91-97, and optionally, wherein the notification comprises a Platform Power State Advertising (PPSA) Information Element (IE) comprising a first field comprising a power indication to indicate a power save state of the first wireless station, and at least one second field comprising the Tx packet coalescing information.

Example 99 includes the subject matter of any one of Examples 91-98, and optionally, wherein the coalescing threshold comprises at least one of a coalescing time threshold or a coalescing size threshold.

Example 100 includes the subject matter of any one of Examples 91-99, and optionally, wherein the radio is to transmit the notification, and to process the one or more transmissions.

Example 101 includes a method to be performed by a first wireless station, the method comprising processing Receive (Rx) packet coalescing information from a host of the first wireless station, the Rx packet coalescing information defining one or more packet types of Rx packets to be coalesced for processing by the host, and a coalescing threshold to limit coalescing of the Rx packets; transmitting to a second wireless station a notification comprising transmit (Tx) packet coalescing information for packet coalescing at the second wireless station, the Tx packet coalescing information comprising packet type information to indicate that packets of the one or more packet types are to be coalesced for the first wireless station at the second wireless station, the Tx packet coalescing information comprising a coalescing threshold indicator to indicate the coalescing threshold is to limit the packet coalescing at the second wireless station; and processing one or more transmissions from the second wireless station comprising one or more packets of the one or more packet types.

Example 102 includes the subject matter of Example 101, and optionally, wherein the one or more transmissions are based on the coalescing threshold.

Example 103 includes the subject matter of Example 101 or 102, and optionally, wherein the one or more transmissions are before the coalescing threshold is reached, only when the one or more transmissions include at least one packet of a packet type, which is not included in the one or more packet types.

Example 104 includes the subject matter of any one of Examples 101-103, and optionally, wherein the one or more transmissions are only when the coalescing threshold is reached, and the one or more transmissions include only packets of the one or more packet types.

Example 105 includes the subject matter of any one of Examples 101-104, and optionally, wherein the notification comprises a power save indication to indicate a power save state of the first wireless station.

Example 106 includes the subject matter of Example 105, and optionally, comprising indicating that the packet coalescing at the second wireless station is to be terminated by transmitting to the second wireless station a subsequent notification comprising a power active indication to indicate a power active state of the first wireless station.

Example 107 includes the subject matter of any one of Examples 101-106, and optionally, comprising transmitting a subsequent notification to the second wireless station to terminate the packet coalescing at the second wireless station.

Example 108 includes the subject matter of any one of Examples 101-107, and optionally, wherein the notification comprises a Platform Power State Advertising (PPSA) Information Element (IE) comprising a first field comprising a power indication to indicate a power save state of the first wireless station, and at least one second field comprising the Tx packet coalescing information.

Example 109 includes the subject matter of any one of Examples 101-108, and optionally, wherein the coalescing threshold comprises at least one of a coalescing time threshold or a coalescing size threshold.

Example 110 includes a product comprising one or more tangible computer-readable non-transitory storage media comprising computer-executable instructions operable to, when executed by at least one computer processor, enable the at least one computer processor to cause a first wireless station to process Receive (Rx) packet coalescing information from a host of the first wireless station, the Rx packet coalescing information defining one or more packet types of Rx packets to be coalesced for processing by the host, and a coalescing threshold to limit coalescing of the Rx packets; transmit to a second wireless station a notification comprising transmit (Tx) packet coalescing information for packet coalescing at the second wireless station, the Tx packet coalescing information comprising packet type information to indicate that packets of the one or more packet types are to be coalesced for the first wireless station at the second wireless station, the Tx packet coalescing information comprising a coalescing threshold indicator to indicate the coalescing threshold is to limit the packet coalescing at the second wireless station; and process one or more transmissions from the second wireless station comprising one or more packets of the one or more packet types.

Example 111 includes the subject matter of Example 110, and optionally, wherein the one or more transmissions are based on the coalescing threshold.

Example 112 includes the subject matter of Example 110 or 111, and optionally, wherein the one or more transmissions are before the coalescing threshold is reached, only when the one or more transmissions include at least one packet of a packet type, which is not included in the one or more packet types.

Example 113 includes the subject matter of any one of Examples 110-112, and optionally, wherein the one or more transmissions are only when the coalescing threshold is reached, and the one or more transmissions include only packets of the one or more packet types.

Example 114 includes the subject matter of any one of Examples 110-113, and optionally, wherein the notification comprises a power save indication to indicate a power save state of the first wireless station.

Example 115 includes the subject matter of Example 114, and optionally, wherein the instructions, when executed, cause the first wireless station to indicate that the packet coalescing at the second wireless station is to be terminated by transmitting to the second wireless station a subsequent notification comprising a power active indication to indicate a power active state of the first wireless station.

Example 116 includes the subject matter of any one of Examples 110-115, and optionally, wherein the instructions, when executed, cause the first wireless station to transmit a subsequent notification to the second wireless station to terminate the packet coalescing at the second wireless station.

Example 117 includes the subject matter of any one of Examples 110-116, and optionally, wherein the notification comprises a Platform Power State Advertising (PPSA) Information Element (IE) comprising a first field comprising a power indication to indicate a power save state of the first wireless station, and at least one second field comprising the Tx packet coalescing information.

Example 118 includes the subject matter of any one of Examples 110-117, and optionally, wherein the coalescing threshold comprises at least one of a coalescing time threshold or a coalescing size threshold.

Example 119 includes an apparatus of a first wireless device, the apparatus comprising means for processing Receive (Rx) packet coalescing information from a host of the first wireless station, the Rx packet coalescing information defining one or more packet types of Rx packets to be coalesced for processing by the host, and a coalescing threshold to limit coalescing of the Rx packets; means for transmitting to a second wireless station a notification comprising transmit (Tx) packet coalescing information for packet coalescing at the second wireless station, the Tx packet coalescing information comprising packet type information to indicate that packets of the one or more packet types are to be coalesced for the first wireless station at the second wireless station, the Tx packet coalescing information comprising a coalescing threshold indicator to indicate the coalescing threshold is to limit the packet coalescing at the second wireless station; and means for processing one or more transmissions from the second wireless station comprising one or more packets of the one or more packet types.

Example 120 includes the subject matter of Example 119, and optionally, wherein the one or more transmissions are based on the coalescing threshold.

Example 121 includes the subject matter of Example 119 or 120, and optionally, wherein the one or more transmissions are before the coalescing threshold is reached, only when the one or more transmissions include at least one packet of a packet type, which is not included in the one or more packet types.

Example 122 includes the subject matter of any one of Examples 119-121, and optionally, wherein the one or more transmissions are only when the coalescing threshold is reached, and the one or more transmissions include only packets of the one or more packet types.

Example 123 includes the subject matter of any one of Examples 119-122, and optionally, wherein the notification comprises a power save indication to indicate a power save state of the first wireless station.

Example 124 includes the subject matter of Example 123, and optionally, comprising means for indicating that the packet coalescing at the second wireless station is to be terminated by transmitting to the second wireless station a subsequent notification comprising a power active indication to indicate a power active state of the first wireless station.

Example 125 includes the subject matter of any one of Examples 119-124, and optionally, comprising means for transmitting a subsequent notification to the second wireless station to terminate the packet coalescing at the second wireless station.

Example 126 includes the subject matter of any one of Examples 119-125, and optionally, wherein the notification comprises a Platform Power State Advertising (PPSA) Information Element (IE) comprising a first field comprising a power indication to indicate a power save state of the first wireless station, and at least one second field comprising the Tx packet coalescing information.

Example 127 includes the subject matter of any one of Examples 119-126, and optionally, wherein the coalescing threshold comprises at least one of a coalescing time threshold or a coalescing size threshold.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising circuitry and logic configured to cause a first wireless station to:
   process a notification from a second wireless station comprising transmit (Tx) packet coalescing information, the Tx packet coalescing information comprising packet type information to define one or more packet types for packet coalescing at the first wireless station, and a coalescing threshold indicator to indicate a coalescing threshold to limit the packet coalescing at the first wireless station;
   coalesce a plurality of packets for said second wireless station by buffering the plurality of packets at the first wireless station, the plurality of packets having at least one of the one or more packet types; and
   based at least on said coalescing threshold, process one or more buffered packets of the plurality of packets for transmission to the second wireless station, processing the one or more buffered packets for transmission comprises processing the one or more buffered packets for transmission to the second wireless station upon processing a packet for said second wireless station, the packet having a packet type, which is not included in the one or more packet types.

2. The apparatus of claim 1 configured to cause the first wireless station to, upon reaching said coalescing threshold, process the one or more buffered packets for transmission to the second wireless station.

3. The apparatus of claim 1 configured to cause the first wireless station to process the one or more buffered packets for transmission to the second wireless station when the packet having the packet type, which is not included in the one or more packet types, is available for the second wireless station even if said coalescing threshold is not reached.

4. The apparatus of claim 1 configured to cause the first wireless station to process the one or more buffered packets for transmission to the second wireless station only upon reaching said coalescing threshold, when no packet having the packet type, which is not included in the one or more packet types, is available for said second wireless station prior to reaching said coalescing threshold.

5. A product comprising one or more tangible computer-readable non-transitory storage media comprising computer-executable instructions operable to, when executed by at least one processor, enable the at least one processor to cause a first wireless station to:
   process a notification from a second wireless station comprising transmit (Tx) packet coalescing information, the notification comprising a power save indication to indicate a power save state of said second wireless station, the Tx packet coalescing information comprising packet type information to define one or more packet types for packet coalescing at the first wireless station, and a coalescing threshold indicator to indicate a coalescing threshold to limit the packet coalescing at the first wireless station;
   based on said power save indication, initiate packet coalescing to coalesce a plurality of packets for said second wireless station by buffering the plurality of packets at the first wireless station, the plurality of packets having at least one of the one or more packet types;
   based at least on said coalescing threshold, process one or more buffered packets of the plurality of packets for transmission to the second wireless station; and
   terminate the packet coalescing for the second wireless station upon receipt of a subsequent notification from said second wireless station, the subsequent notification comprising a power active indication to indicate a power active state of said second wireless station.

6. The apparatus of claim 1, wherein said notification comprises a power save indication to indicate a power save state of said second wireless station.

7. The apparatus of claim 6 configured to cause the first wireless station to initiate packet coalescing for the second wireless station based on said power save indication, and to terminate the packet coalescing for the second wireless station upon receipt of a subsequent notification from said second wireless station, the subsequent notification comprising a power active indication to indicate a power active state of said second wireless station.

8. The apparatus of claim 1 comprising a buffer to buffer said plurality of packets, and a Tx coalescing module configured to selectively buffer a packet in the buffer based on a comparison between a packet type of the packet and said one or more packet types.

9. The apparatus of claim 8 comprising a Station Management Entity (SME) configured to process said notification from the second wireless station, and to configure said Tx coalescing module based on said Tx packet coalescing information.

10. The apparatus of claim 8 comprising a Media Access Control (MAC) processor, the Tx coalescing module to provide the one or more buffered packets to the MAC processor based at least on said coalescing threshold.

11. The apparatus of claim 1, wherein the coalescing threshold comprises at least one of a coalescing time threshold or a coalescing size threshold, the coalescing time threshold to limit a time period to buffer the plurality of packets, the coalescing size threshold to limit a total size of the plurality of packets.

12. The apparatus of claim 1 configured to cause the first wireless station to transmit said one or more buffered packets within a same Transmit Opportunity (TxOP).

13. The apparatus of claim 1, wherein the notification comprises a Platform Power State Advertising (PPSA) Information Element (IE) comprising a first field comprising a power indication to indicate a power save state of said second wireless station, and at least one second field comprising the Tx packet coalescing information.

14. The apparatus of claim 1 comprising a radio to receive the notification, and to transmit said one or more buffered packets.

15. The apparatus of claim 1 comprising one or more antennas, a memory and a processor.

16. The product of claim 5, wherein the instructions, when executed, cause the first wireless station to process the one or more buffered packets for transmission to the second wireless station upon processing a packet for said second wireless station, the packet having a packet type, which is not included in the one or more packet types.

17. The product of claim 5, wherein the instructions, when executed, cause the first wireless station to, upon reaching said coalescing threshold, process the one or more buffered packets for transmission to the second wireless station.

18. The product of claim 5, wherein the instructions, when executed, cause the first wireless station to process the one or more buffered packets for transmission to the second wireless station when a packet having a packet type, which is not included in the one or more packet types, is available for the second wireless station even if said coalescing threshold is not reached.

19. An apparatus comprising circuitry and logic configured to cause a first wireless station to:
  process Receive (Rx) packet coalescing information from a host of the first wireless station, the Rx packet coalescing information defining one or more packet types of Rx packets to be coalesced for processing by the host, and a coalescing threshold to limit coalescing of the Rx packets;
  transmit to a second wireless station a notification comprising a power save indication to indicate a power save state of said first wireless station, the notification comprising transmit (Tx) packet coalescing information for packet coalescing at the second wireless station, the Tx packet coalescing information comprising packet type information to indicate that packets of the one or more packet types are to be coalesced for the first wireless station at the second wireless station, the Tx packet coalescing information comprising a coalescing threshold indicator to indicate the coalescing threshold is to limit the packet coalescing at the second wireless station;
  process one or more transmissions from the second wireless station comprising one or more packets of the one or more packet types; and
  transmit to the second wireless station a subsequent notification to indicate that the packet coalescing at the second wireless station is to be terminated, the subsequent notification comprising a power active indication to indicate a power active state of said first wireless station.

20. The apparatus of claim 19, wherein the coalescing threshold comprises at least one of a coalescing time threshold or a coalescing size threshold.

21. The apparatus of claim 19, wherein the notification comprises a Platform Power State Advertising (PPSA) Information Element (IE) comprising a first field comprising a power indication to indicate a power save state of said first wireless station, and at least one second field comprising the Tx packet coalescing information.

22. The apparatus of claim 19 comprising one or more antennas, a memory and a processor.

23. A product comprising one or more tangible computer-readable non-transitory storage media comprising computer-executable instructions operable to, when executed by at least one processor, enable the at least one processor to cause a first wireless station to:
  process Receive (Rx) packet coalescing information from a host of the first wireless station, the Rx packet coalescing information defining one or more packet types of Rx packets to be coalesced for processing by the host, and a coalescing threshold to limit coalescing of the Rx packets;
  transmit to a second wireless station a notification comprising a power save indication to indicate a power save state of said first wireless station, the notification comprising transmit (Tx) packet coalescing information for packet coalescing at the second wireless station, the Tx packet coalescing information comprising packet type information to indicate that packets of the one or more packet types are to be coalesced for the first wireless station at the second wireless station, the Tx packet coalescing information comprising a coalescing threshold indicator to indicate the coalescing threshold is to limit the packet coalescing at the second wireless station;
  process one or more transmissions from the second wireless station comprising one or more packets of the one or more packet types; and
  transmit to the second wireless station a subsequent notification to indicate that the packet coalescing at the second wireless station is to be terminated, the subsequent notification comprising a power active indication to indicate a power active state of said first wireless station.

24. The product of claim 23, wherein the notification comprises a Platform Power State Advertising (PPSA) Information Element (IE) comprising a first field comprising a power indication to indicate a power save state of said first wireless station, and at least one second field comprising the Tx packet coalescing information.

* * * * *